United States Patent
Wilf et al.

(10) Patent No.: US 10,019,653 B2
(45) Date of Patent: Jul. 10, 2018

(54) METHOD AND SYSTEM FOR PREDICTING PERSONALITY TRAITS, CAPABILITIES AND SUGGESTED INTERACTIONS FROM IMAGES OF A PERSON

(71) Applicant: Faception Ltd., Atlit (IL)

(72) Inventors: Itzhak Wilf, Savyon (IL); Yael Michaeli, Tel Aviv (IL); Shai Gilboa, Atlit (IL); David Gavriel, Oranit (IL); Gilad Bechar, Fair Lawn, NJ (US)

(73) Assignee: Faception Ltd., Atlit (IL)

( * ) Notice: Subject to any disclaimer, the term of this patent is extended or adjusted under 35 U.S.C. 154(b) by 0 days.

(21) Appl. No.: 14/700,315

(22) Filed: Apr. 30, 2015

(65) Prior Publication Data

US 2015/0242707 A1    Aug. 27, 2015

Related U.S. Application Data

(63) Continuation-in-part of application No. PCT/IL2013/050892, filed on Oct. 31, 2013.

(60) Provisional application No. 61/858,686, filed on Jul. 26, 2013, provisional application No. 61/721,571, filed on Nov. 2, 2012.

(51) Int. Cl.
G06K 9/00 (2006.01)
G06K 9/62 (2006.01)

(52) U.S. Cl.
CPC ....... *G06K 9/6267* (2013.01); *G06K 9/00268* (2013.01); *G06K 9/00302* (2013.01); *G06K 9/627* (2013.01); *G06K 9/6256* (2013.01)

(58) Field of Classification Search
CPC .......... G06K 9/6256–9/6287; G06K 9/00302–9/00315; G06K 2009/00322; G06K 2009/00328
See application file for complete search history.

(56) References Cited

U.S. PATENT DOCUMENTS

| | | | |
|---|---|---|---|
| 9,070,088 B1 * | 6/2015 | Baveja | G06F 21/316 |
| 2002/0045154 A1 * | 4/2002 | Wood | G06Q 30/02 434/350 |

(Continued)

FOREIGN PATENT DOCUMENTS

WO    2012/139243 A1    10/2012

OTHER PUBLICATIONS

Rojas Mario Q. et al., "Automatic Prediction of Facial Trait Judgments: Appearance Vs. Structural Models", PLOS ONE, vol. 6, No. 8, Aug. 17, 2011, p. e23323 (12 pages).

(Continued)

*Primary Examiner* — Aaron W Carter

(57) ABSTRACT

The invention relates to a method of predicting personality characteristic from images of a subject person's face, comprising: a) collecting training images of multiple persons for training propose, the images associated with metadata characteristics of human personality; b) grouping the collected training images into training groups; c) training at least one image-based classifier to predict at least one characteristics of human personality from at least one image of a second person; and d) applying the at least one image-based classifier to at least one image of the subject person for outputting a prediction of at least one human personality characteristic of the subject person.

16 Claims, 16 Drawing Sheets

(56) References Cited

U.S. PATENT DOCUMENTS

| | | | |
|---|---|---|---|
| 2004/0181145 A1* | 9/2004 | Al Bandar | A61B 5/164 600/408 |
| 2005/0102246 A1* | 5/2005 | Movellan | G06K 9/00248 706/12 |
| 2005/0250081 A1* | 11/2005 | Salladay | G09B 7/02 434/236 |
| 2007/0048706 A1* | 3/2007 | Tan | G09B 7/00 434/236 |
| 2008/0002892 A1* | 1/2008 | Jelonek | G06F 17/30265 382/224 |
| 2008/0080745 A1* | 4/2008 | Vanhoucke | G06F 17/30253 382/118 |
| 2008/0201144 A1* | 8/2008 | Song | G06K 9/00281 704/236 |
| 2008/0240563 A1* | 10/2008 | Takano | H04N 5/23219 382/173 |
| 2009/0234842 A1 | 9/2009 | Luo et al. | |
| 2009/0285456 A1* | 11/2009 | Moon | G06K 9/00335 382/118 |
| 2010/0074465 A1 | 3/2010 | Scheneemann | |
| 2010/0249538 A1* | 9/2010 | Pradeep | A61B 5/16 600/301 |
| 2010/0266213 A1* | 10/2010 | Hill | A61B 5/16 382/218 |
| 2010/0325135 A1* | 12/2010 | Chen | G06F 17/30053 707/759 |
| 2011/0141258 A1 | 6/2011 | Song et al. | |
| 2011/0299764 A1* | 12/2011 | Snoek | G06F 17/30256 382/159 |
| 2012/0002848 A1* | 1/2012 | Hill | A61B 5/164 382/118 |
| 2012/0002881 A1* | 1/2012 | Maeda | G06K 9/00677 382/195 |
| 2012/0284080 A1* | 11/2012 | De Oliveira | G06Q 10/04 705/7.29 |
| 2013/0259332 A1* | 10/2013 | McVey | G06T 7/0012 382/128 |
| 2014/0037264 A1* | 2/2014 | Jackson | H04N 5/44513 386/230 |
| 2014/0050408 A1* | 2/2014 | Balasubramanian | G06K 9/00315 382/195 |
| 2014/0156398 A1* | 6/2014 | Li | G06Q 30/0251 705/14.53 |
| 2014/0321737 A1* | 10/2014 | Movellan | G06K 9/00302 382/159 |
| 2015/0084858 A1* | 3/2015 | Murakami | G06Q 30/0255 345/156 |
| 2015/0131872 A1* | 5/2015 | Ganong | G06K 9/00677 382/118 |
| 2015/0242707 A1* | 8/2015 | Wilf | G06K 9/00302 382/159 |
| 2015/0278590 A1* | 10/2015 | Gunjan | G06K 9/00362 382/107 |
| 2015/0310344 A1* | 10/2015 | Gunjan | G06N 99/005 706/52 |
| 2016/0155355 A1* | 6/2016 | Merzenich | A63F 13/80 434/236 |
| 2016/0217319 A1* | 7/2016 | Bhanu | G06K 9/00288 |
| 2016/0224869 A1* | 8/2016 | Clark-Polner | G06K 9/6254 |
| 2016/0239573 A1* | 8/2016 | Albert | G06F 17/30867 |

OTHER PUBLICATIONS

Brahnam S et al., "Predicting trait impressions of faces using local face recognition techniques", Expert Systems With Applications, Oxford, GB, vol. 37, No. 7, Jul. 1010, pp. 5086-5093 (8 pages).

Communication and Supplementary Partial European Search Report from a counter-part application (EP 13 85 0336) dated Jul. 20, 2016 (9 pages).

International Search Report from counterpart foreign application, 3 pages, dated Feb. 11, 2014.

Communication from a foreign patent office (European Patent Office) in a counterpart foreign application (European patent application No. 13850336.2); 23 pages, dated Dec. 8, 2016.

Yang et al., "Automatic Physiognomic Analysis by Classifying Facial Component Features", The 18th International Conference on Pattern Recognition (ICPR'06) 2006, vol. 2, pp. 1212-1215 (4 pages).

Lisetti et al., "Automatic Facial Expression Interpretation: Where Human-Computer Interaction, Artificial Intelligence and Cognitive Science Intersect", Pragmatics and Cognition 2000, vol. 8 (1), pp. 185-235 (31 pages).

Mohammadi et al., "Automatic personality perception: Prediction of trait attribution based on prosodic features", IEEE Transactions on affective computing 2012, vol. 2 (3), pp. 273-284 (12 pages).

Wu et al., "Emotion recognition of affective speech based on multiple classifies using acoustic-prosodic information and semantic labels", IEEE Transactions on affective computing 2011, vol. 2 (1), pp. 10-21 (12 pages).

* cited by examiner

Learning & Prediction of personality traits from face images

Gathering face images for prediction

METHOD AND SYSTEM FOR PREDICTING PERSONALITY TRAITS, CAPABILITIES AND SUGGESTED INTERACTIONS FROM IMAGES OF A PERSON

FIELD OF THE INVENTION

The present invention relates to the field of machine learning systems. More particularly, the invention relates to a method for predicting personality traits based on automated computerized or computer assisted analysis of that person's body images and in particular face images.

BACKGROUND OF THE INVENTION

Humans judge other humans based on their face images, predicting personality traits (such as generosity, reliability), capabilities (intelligence, precision) even guessing professions (a teacher, a care-giver, a lawyer) from a face image alone. Psychological research has found a high degree of correlation in such judgments (different people interpreting the same face image in a similar manner). Moreover, psychological research has also found a certain degree of correlation between face appearances and ground truth or real-world performance (successful CEO, winning martial arts fighter, etc).

Psychologists, counselors, coaches, therapists gather information on one's personal traits and those of others to analyze and advise on interactions in the social and business domains. However, it is clear that different people have different judgment capabilities, some judgments may be pure prejudice, and in any case it is impractical to rely on human judgment to process high-volumes of data in an efficient and repeatable manner.

In the prior art, face image analysis techniques have been provided to detect the emotional state of a person—e.g. anger/happiness/sadness by tracking or recognizing an expression defined by certain deformation of the face image as measured for example from the relative distances between facial landmarks, e.g., as disclosed by US Patent application No. 2011/0141258 "emotion recognition method and system thereof". In contrast, the present invention measures traits or fixed personality characteristics which do not change over time. Actually, a neutral expression is preferred, as non-neutral expression, in particular an extreme emotional state, may distort the usual appearance of the person being analyzed.

It is an object of the present invention to provide a system which is capable of predicting personality traits based on automated computerized or computer assisted analysis of that person's body images and in particular face images.

It is another an object of the present invention to provide an automated method of selecting personality traits and capabilities that can be predicted from face images and predicting such traits and capabilities from one or more face images.

It is yet another object of the present invention to mechanize the process of personality analysis and interaction management, using automated methods in the field of image analysis, video analysis, machine learning and natural language generation.

Other objects and advantages of the invention will become apparent as the description proceeds.

SUMMARY OF THE INVENTION

The present invention relates to a method of predicting personality traits from at least one image of a subject person body, in particular images of the person's face, comprising:

a) Collecting training images of multiple persons for machine learning training propose in order to identify personality traits from said images, wherein each of said training images is associated with metadata characteristics of human personality traits;

b) Grouping said collected training images into training groups according to said associated metadata, either according to the same metadata or similar metadata;

c) Applying machine learning algorithm(s) on the images in at least one of said training groups for training at least one image-based classifier to predict at least one characteristics of human personality trait from at least one image of a specific subject person; and d) Applying said at least one image-based classifier to at least one image of said specific subject person for outputting a prediction of at least one human personality trait of said specific subject person.

According to an embodiment of the invention, the personality characteristics and the associated metadata characteristics are selected from the group consisting of: at least one personality trait from a set of human traits, or at least one personal capability from a set of capabilities, or at least one behavior from a set of human behaviors. According to an embodiment of the invention, the associated metadata is at least one of the following: profession (researcher/lawyer/coach/psychologist), online behavior (buyer type), endorsements from social network (LinkedIn), crowd source, real-world behavior (location, travel, etc.).

According to an embodiment of the invention, the method further comprises converting selected face images into a standard, normalized representation by performing geometric rectification and/or frontalization on said face images.

According to an embodiment of the invention, the method further comprises applying techniques of pose classification in order to facilitate representation, learning and classification of the images.

According to an embodiment of the invention, the method further comprises aligning face images into the nearest reference pose, in the case where not enough full frontal or side profile images are available for personality analysis.

According to an embodiment of the invention, the method further comprises linking groups of face landmarks into contours, thereby obtaining another type of face region segmentation, which in particular is useful for the chin area and the ears in side profile view.

According to an embodiment of the invention, the method further comprises providing an image descriptors computation module for generating multiple image descriptors from the whole face images or from specific face parts, during classifier development process to facilitate a specific trait or capability, wherein using said multiple image descriptors, an array of classifier modules is able to predict one or more personality traits/capability, either with or without an associated magnitude. According to an aspect of the invention, the method further comprises integrating the one or more personality traits/capability with associated magnitude into a coherent set of personality descriptors, such that whenever a descriptor is manifested in more than one result, a weighting process produces a weighted combination of the individual results.

According to an embodiment of the invention, the method further comprises: a) predicting at least one personality characteristic, from the at least one image of the subject person; and combining said at least one personality characteristic with other personality characteristics or with at least one additional metadata relating to said subject person into a composite score associated metadata characteristics. For example, the additional metadata can be demographic data. The composite score can be obtained from at least one face-derived personality trait/capability/behavior with optional metadata, by method of weighing.

According to an embodiment of the invention, the method further comprises searching/ranking individuals by face-based personality traits/capabilities that include the steps of:
a) Collecting at least one face image for each of said individuals;
b) Predicting at least one personal trait from a set of human traits, or at least one personal capability from a set of capabilities, or at least one behavior from a set of human behaviors, from said at least one face image for each of said individuals;
c) Combining said at least one personal trait from a set of human traits, or at least one personal capability from a set of capabilities, or at least one behavior from a set of human behaviors, with other trait/capability/behavior or at least one additional metadata relating to each of said individuals into a composite score; and
d) Ordering said individuals based on said composite score and selecting at least one individual based on said ordering.

According to an embodiment of the invention, the method of weighing includes at least one weight computed using training data and machine learning techniques. In one aspect, the method of weighing includes at least one weight assigned manually. In another aspect, the method of weighing includes at least one weight computed using training data and machine learning techniques.

According to an embodiment of the invention, the method further comprises generating description of multiple personality characteristics by applying a plurality of image-based classifiers to one or images of the subject person, wherein said personality description is obtained by a face-based personality analysis module.

According to an embodiment of the invention, the method further comprises implementing the face-based personality analysis module in multimedia systems or applications adapted to interact with one or more persons in real-time, such that face images of person(s) can be captured from an imaging module associated with said multimedia system or application, in order to be analyzed by said module, either in real-time or off-line. For example, the multimedia systems or applications can be selected from the group consisting of: video chat, conferences call, wearable computers, portable computer based devices, desktop computer based systems, CRM, set-top boxes, smartphones, gaming consoles, video cameras, smartphones and other mobile devices.

According to an embodiment of the invention, the process of the face-based personality analysis module may further comprise one or more additional tasks such as: searching for additional images of the subject person by using a name search engine that can be augmented by face recognition by face recognition and analyzing said additional images to enhance the accuracy of predicted personality traits or capabilities. For example, analyzing the content of textual data during the interaction, converting audio signals of verbal communication during the interaction to written communications, either to be presented during the interaction and/or to be analyzed for content and meaning, analyzing audio signals of verbal communication by voice-based analyzer for obtaining personality/situation/emotion cues, and generating interaction recommendations—generic and content-based, according to the description of personality characteristics, such that interaction analysis and the generated recommendations are integrated within the applications. The face-based personality analysis module can be configured to present personality characteristics of the person(s) during the interaction with said person(s). In some embodiments, the face-based personality analysis module presents personality characteristics of the person(s) during the interaction with said person(s). The method may further comprise analyzing information during the interaction from plurality of content sources, including content of textual data either written data or converted audio signals of verbal communication during the interaction and integrating such information with predicted personality traits.

According to an embodiment of the invention, the method further comprises classifying the type of the subject person according to one or more predicted personality characteristics, thereby allowing facilitating personal advertising by providing adaptive message to said subject person according to said classifications.

According to another aspect the present invention relates to a computer-readable medium that stores instructions executable by one or more processing devices to perform a method for predicting personality characteristic from at least one image of a person, comprising:
a) Instructions for collecting images of multiple persons with associated metadata characteristic of human personality;
b) Instructions for grouping said collected images into training groups according to said metadata;
c) Instructions for training at least one image-based classifier to predict at least one characteristic of human personality from said at least one image of said person; and
d) Instructions for applying said at least one image-based classifier to said at least one image of said person and accordingly outputting a prediction of at least one characteristic of human personality.

The present invention permits the characterization of one's personality based on automated computerized or computer-assisted analysis of that person's body images.

According to the present invention, analysis output can be in concise text form, as list of traits with magnitude for each such trait. Additionally, the present invention allows generating rich-text personality descriptions by combining Natural Language Generation (NLG) with the above-mentioned analysis output.

In a specific embodiment of the present invention, the output style is tailored to the reader's personality (a sensitive person, one with sense of humor, etc.).

Once one's personality traits and capabilities are available (pre-computed/in real-time), the present invention allows managing person to person interaction and/or machine-person interaction using one or more of the following interaction management techniques:
Analyzing the personality of 2 or more people and further analyzing the interactions between them (example: couple, parent-child, employer-employee, etc.).
Providing best practices recommendation for improved interaction and communication of said 2 or more people (for example, marriage consulting).
Analyzing the personality of a designated person and suggesting preferred practices of approaching and further interacting with that person to the person performing the interaction (the "user" which may be a sales person, customer support person, emergency services person).

Resolving personal and interpersonal communication problems, by suggesting best practices for the analyzed person to communicate with other persons in social and business environments.

Recommending best matches and best practices in matching, sexing, dating other persons, based on compatible characteristics and traits Combining the personality traits of the designated person with pre-computed personality traits of said "user" to further improve/focus said preferred practices.

Analyzing the personality of a designated person and evaluating the suitability of that person to a job or function or purpose [filtering candidates, interaction best practices for interview]. Said suitability can be defined as a correlation measure between the personality traits of the designated person and the preferred personality characteristics for said job/function/purpose, where purpose may be one or more of the following: sexing/dating/marriage.

Identifying strong and weak points of opponents in debates, contests, reality programs, games, gambling, sports and further devising winning strategies and best practices to optimize the user positioning and outcomes of such interactions.

Providing a search tool/filter/engine based on personality traits, in various domains, locations, or for people which may:
  possess one or more pre-defined traits such as "kind", "intelligent", "analytic";
  have matching/compatible/opposing traits to me/someone I know/a famous individual (movie star/sport champion or celebrity);
  exhibit a certain online/real-world behavior: criminal/terrorist, aggressive, gambling, buying, investing, early adopter in fashion or technology;
  have a significant life-time value as a customer.

The personality traits used by said search tool are primarily derived from face images according to the present invention. However, additional tags/metadata can be used by the search tool to facilitate or focus search including personality traits obtained by other means, non-personality metadata (such a location, age, and gender), web-based endorsements (e.g., LinkedIn endorsements), etc.

As a specific example, the task of matching young candidates to a researcher position, when a significant track record which may reflect desired traits and capabilities is not available for the candidate, and therefore the candidate's future performance must be predicted.

Current searching for the right candidate relies on reading resumes, interviewing candidates, conducting reference calls and observing the candidate behavior in "group dynamics" observed by psychologists. Now the present invention facilitates finding the candidate by:
  Gathering face images of all candidates: asking candidates to furnish such images (preferably in full frontal or side profile views), or using a face image gathering process as described in the present invention (see FIG. 2).
  Computing one or more personality traits from said face images, per the present invention. Alternatively only key traits as required for the specific job are extracted. Each computed trait is associated with a value/magnitude of the trait.
  Correlating the set of required traits (and values) and the set of computed traits (and values) to produce a matching score between the candidate and the position. As not all traits are equally important the correlation will be weighted, based on relative importance of weight associated with the specific trait.

Once the set of candidates is filtered as described above and several of these candidates are summoned for an interview or another decision/persuasion process, the system will generate a proposed interaction with each of these candidates, to get the best result from such further process. For that purpose the system according to the present invention may suggest strong and weak points of the candidate to elaborate on during interview or for further investigation.

Alternatively, according to a different embodiment of the present invention, a more "integral" approach may be selected, by training a classifier to predict the membership of a person to the "researchers" group, using a large training set of researchers in the domain of interest and a comparable training set of persons from the general population.

In a different set of embodiments of the present invention, the "user" is not a human but a machine, computer or other automated/mechanical means such as: Information kiosk, Vending machine, Robotic systems, Gaming console/software, Gambling software, Customer support/CRM software, Any product/software user interface (UI/UX), Medical prognosis and interaction with patients, Smartphone/computerized intelligence or interactions like personal assistance applications using voice and/or speech recognition, Sales to businesses and to consumers, Security intelligence, detecting fraud, suspects, Banking, ATM where identification of dishonest traits will elevate the security measures, requires further identifying details, will trigger an alert, etc., Advertising to people based on the consumer traits and characteristics, Machine/robot interaction with humans based on the technology, Smart TV According to a further embodiment, personality traits are combined with auxiliary data captured during the interaction, to improve the accuracy or relevance of said auxiliary data and to improve the interaction management.

Auxiliary data may be captured in real-time or recorded and used after-the-fact for interaction analysis.

According to one such embodiment, said Auxiliary data comprise one's written/spoken messages as obtained from textual interaction (SMS/e-mail) or verbal interaction (using speech recognition).

According to one further embodiment, one's personality traits are further integrated/combined with automated body language/expression analysis/voice and speech analysis thus obtaining dynamic, real-time information to augment the personality traits.

According to another embodiment, personality traits derived from body images according to the present invention are combined with further personality cues obtained from handwriting recognition to provide broader/more accurate analysis.

According to an embodiment of the present invention, the method further comprises:
  a) capturing one or more images of a human by a mechanical or virtual artificial agent;
  b) predicting personality traits of said human by using at least one image-based classifier, thereby enabling to personalize an interaction of said artificial agent with said human.

According to an embodiment of the present invention, the metadata contains one or more performance scores, thereby enabling to generate leads in the field of performance based advertising, such that the price per lead or other measure of value is related to a performance measure achievable from at least one of said leads.

In another aspect, the present invention relates to a computer-readable medium that stores instructions executable by one or more processing devices to perform a method for predicting personality traits from at least one image of a person, comprising:
a) Instructions for collecting images of multiple persons with associated metadata characteristic of human personality traits and/or capabilities;
b) Instructions for grouping said collected images into training groups according to said metadata;
c) Instructions for training at least one image-based classifier to predict at least one characteristic of human personality from said at least one image of said person; and Instructions for applying said at least one image-based classifier to said at least one image of said person and accordingly outputting a prediction of at least one characteristic of human personality.

DETAILED DESCRIPTION OF THE INVENTION

Throughout this description the invention is described for the specific case of face images as such images are widely available and/or can be easily captured and provide a majority of personality traits. However, it is clear from the description of the method how to extend the invention to other images that include: head images, hand images, body images. Each body part can produce a personality profile alone or combined with other body parts into a richer, more comprehensive analysis.

Reference will now be made to several embodiments of the present invention, examples of which are illustrated in the accompanying figures. Wherever practicable similar or like reference numbers may be used in the figures and may indicate similar or like functionality. The figures depict embodiments of the present invention for purposes of illustration only. One skilled in the art will readily recognize from the following description that alternative embodiments of the structures and methods illustrated herein may be employed without departing from the principles of the invention described herein.

The method of the present invention teaches the use of machine vision and machine learning techniques to infer personality traits, class membership and personal capabilities traits from face images, thus enabling rapid, automated, accurate and repeatable analysis of mass volumes of humans. The present invention allows automatically identifying/classifying/describing/quantifying such traits using only face images of the analyzed person. According to the present invention, analysis output can be in concise text form, as list of traits with magnitude for each such trait.

The following discussions intended to provide a brief, general description of a suitable computing environment in which the method of the invention may be implemented. While the invention will be described in the general context of program modules that execute in conjunction with an application program that runs on an operating system on a personal computer, those skilled in the art will recognize that the invention may also be implemented in combination with other program modules.

Figure 1:
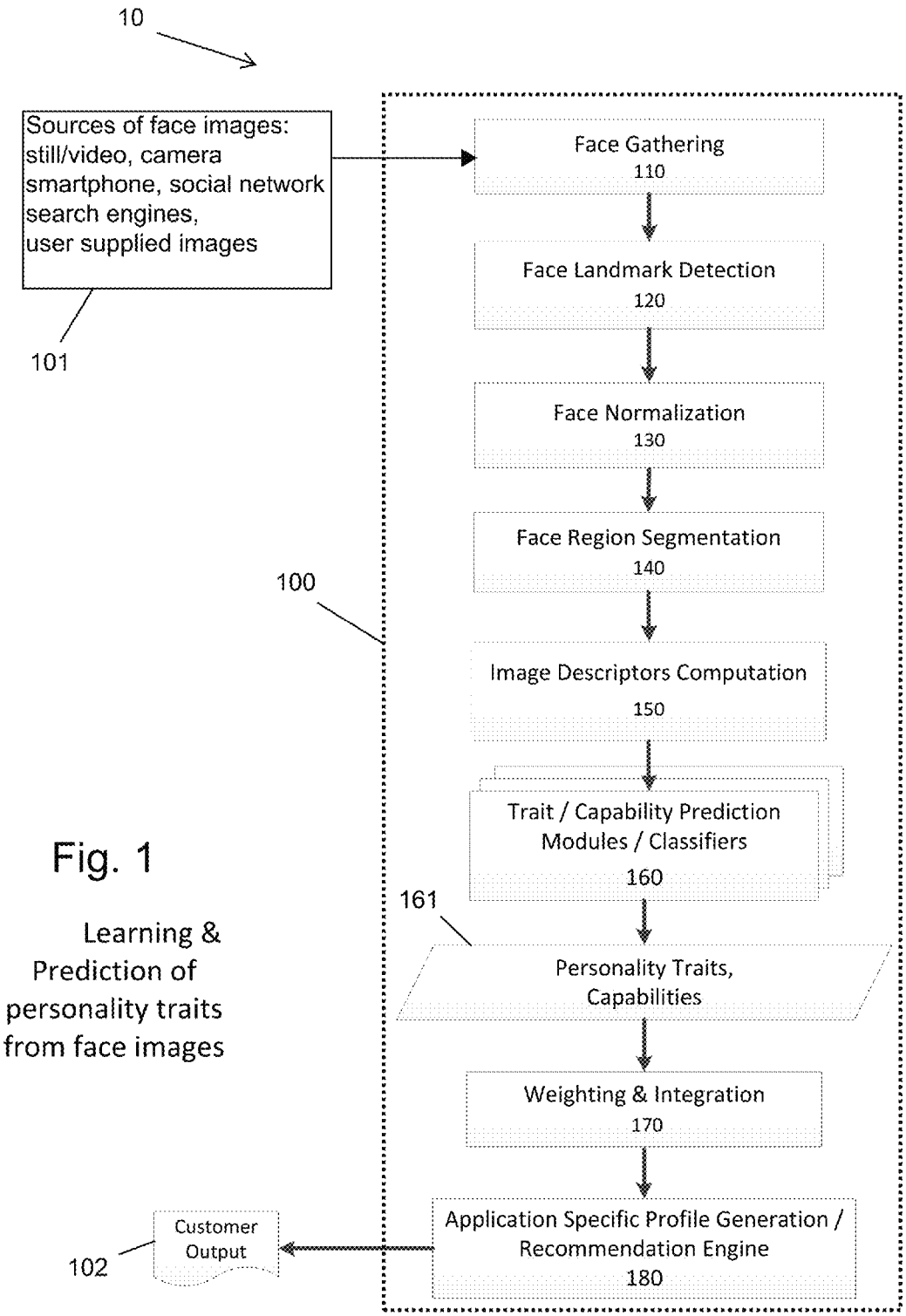
FIG. 1 schematically illustrates a system for extraction of personality traits from face images, according to an embodiment of the present invention.

FIG. 1 schematically illustrates a system 10 for extraction of personality traits from face images, according to an embodiment of the present invention. The system 10 comprises a server 100, a plurality of (face) images sources 101 and at least one terminal device 102. In this embodiment, server 100 includes the following modules: a face gathering module 110, a face landmark detection module 120, a face normalization module 130, a face region segmentation module 140, image descriptors computation module 150, an array of classifier modules 160, weighting and integration module 170 and a profile generation and recommendation engine module 180. The server 100, the sources 101 and the terminal devices 102 may communicate via a data network such as the Internet.

Figure 5:
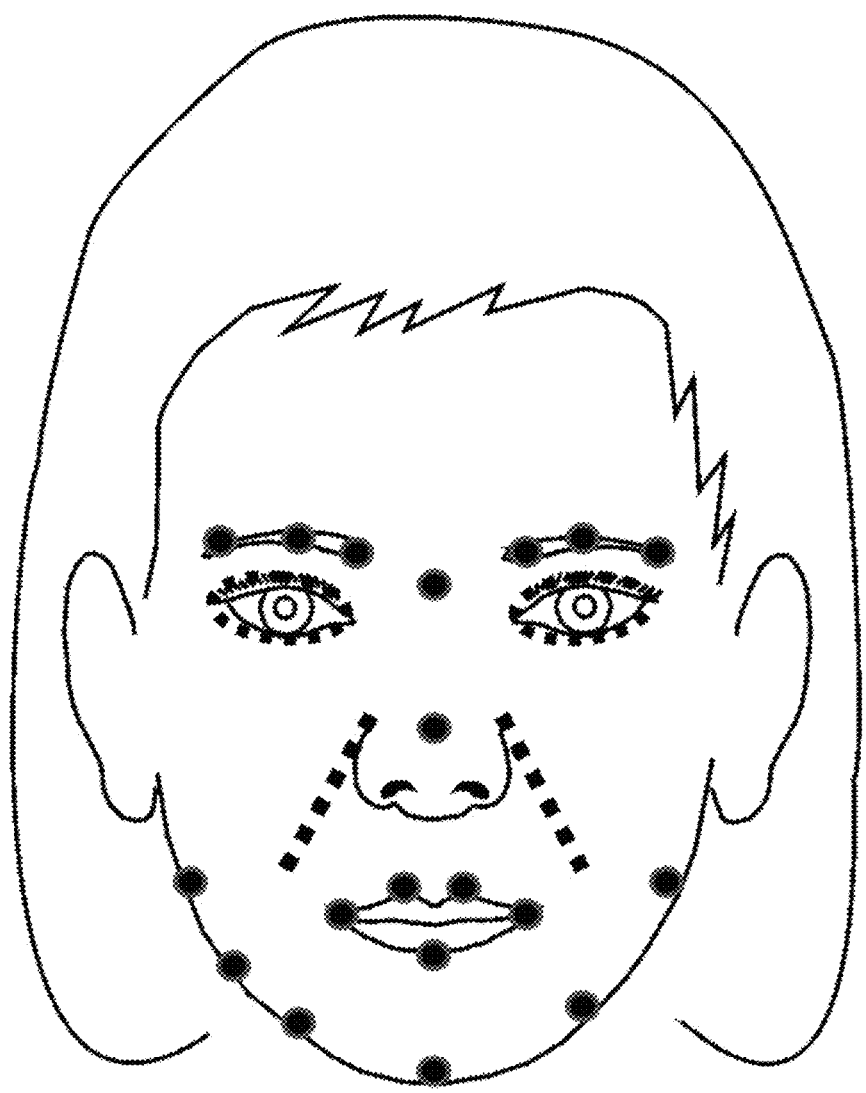
FIG. 5 schematically illustrates an exemplary key points on an image of a person's face.

Module 110 gathers multiple face images of the same persons from multiple sources 101 which may include:
Live capture from stand-alone/integrated camera, as individual images or as a video image sequence (a recorded video clip);
Hand held device such as smartphone, tablet, camera;
Wearable camera with optional display such as Google Glass;
Video-enhanced Internet application;
Video conference system;

Images furnished by the designated person (a job applicant/as part of registration);

A social network (such as Facebook, LinkedIn and the like);

Online photo album management and sharing services such as Picasa;

Search engines such as Google Images;

Face Landmark Detection module 120 performs geometric rectification and/or frontalization of face images, e.g., by searching for specific facial key points that are useful in verifying the face pose and later converting the face image into a standard, normalized representation that may represent a frontal pose, and may have an essentially neutral expression. Such key points customarily include the eyes, eye corners, eyebrows, the nose top, the mouth, the chin, etc. as indicated by the black dots on the face image in FIG. 5. Higher level of detail may include dozens of such points which may be used as an image descriptor for the learning and prediction steps.

Face images are captured in multiple poses and expressions. To facilitate representation, learning and classification we assume that all images are either full frontal or side profile images. In most situations, a large number of available images will allow selecting such images for training and prediction, where such selection can be manual or automatic, using prior art techniques of pose classification.

In the case where not enough full frontal or side profile images are available for personality analysis, face normalization module 130, aligns the face image into the nearest reference pose. Such normalization is necessary in order to derived normalized metrics for identification of personality traits and/or to compare the face region images with database images, said comparison being in direct form (image-to-image) or by extracting and comparing/classifying features or image descriptors. Reference pose may include the full frontal pose, the side profile pose and other poses. The face normalization can be obtained by implementing known techniques such as disclosed by the publication of X. Chai et al., "Pose Normalization for Robust Face Recognition Based on Statistical Affine Transformation, IEEE Pacific-Rim Conference on Multimedia, Singapore 2003.

Face segmentation module 140 uses normalized face images and the location of face landmarks to designate face regions to be used for face parts analysis 150.

Face segmentation may use multiple methods. For example, by gathering skin tone statistics as the dominant color component of the face, regions that deviate from skin color may be detected—such as the lips and the eyes.

By linking groups of face landmarks into contours, another type of face region segmentation is obtained. This is useful for the chin area, for the ears in side profile view, etc.

Alternatively, when image descriptors used for learning and prediction are extracted from the entire face images, Face image segmentation 150 is used to mask out background details that may affect the accuracy of the classifiers, optionally including the subject hair.

Image descriptors computation module 150 generates multiple image descriptors from the whole face images or from specific face parts that have been shown, during classifier development to provide better accuracy for a specific trait or capability. Said descriptors which are detailed below should be characteristic of face structure, immune to disturbances such as illumination effect, of relatively low dimensionality and of course suitable for learning and accurate prediction.

Using said face part or whole face descriptors, an array of classifier modules 160 predict one or more personality traits/capability with associated magnitude. A collection of such personality traits/capability is indicated by numeral 161.

Module 170 integrates the collection 161 into a coherent set of personality descriptors. Whenever a descriptor is manifested in more than one result, a weighting process produces a weighted combination (for example a weighted average) of the individual results.

In a specific embodiment, weighs are assigned manually, based on HR best practices, sociological research, etc. In another specific embodiment, weighs are learned automatically from a training group of successful individuals (successful from real-world metadata, according to crowd source, etc.) using machine learning tools such as Support Vector Machine (SVM), boosting, neural networks, decision trees and others.

Module 180 translates the identified traits and their values/magnitudes into a suitable presentation of the personality profile and/or interaction recommendation. An exemplary output is described in further details with respect to FIG. 9 hereinafter.

Module 180 also produces certain output to the user, regarding the quality of the input pictures, the amount of information extracted and further instructions. For example, if the gathered images are full frontal image only, than some traits requiring side profile images will be missing. The system will prompt the user with messages such as:

Personality profile 75% done.

Please add side profile images

Figure 2:
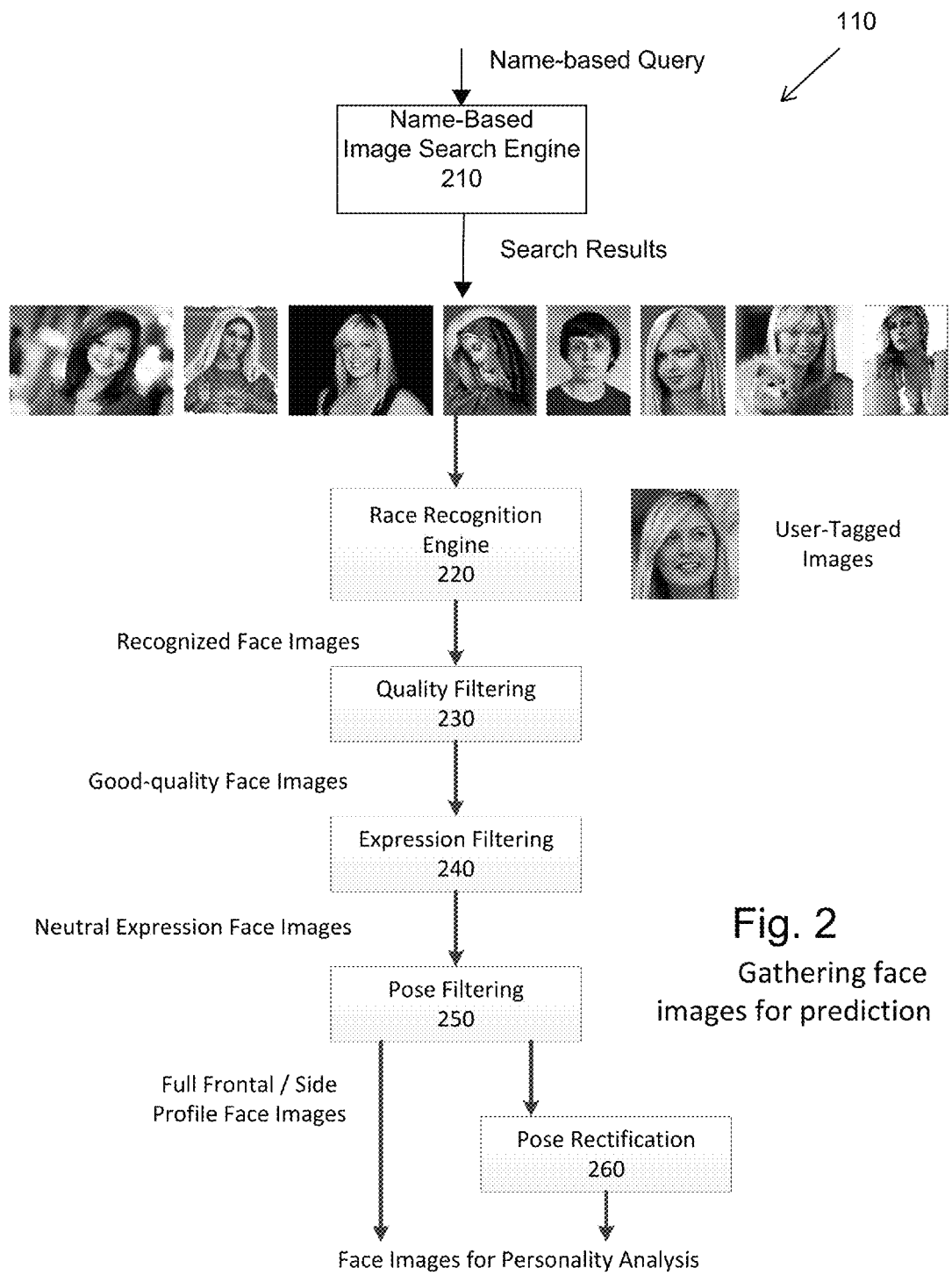
FIG. 2 schematically illustrates a face gathering module of the system, according to an embodiment of the invention.

FIG. 2 describes the face gathering module 110 in further details, according to an embodiment of the invention. Image search engines 210 such as Google Images generate multiple search results upon a name search. Certain filters in the search engine allow returning only images with faces, only images larger than a certain size, etc.

Similarly, face images of the designated person may be collected through social networks (e.g., "Facebook"), online photo album (e.g., "Picasa"), optionally incorporating human or machine tagging of said photos.

Search results may include face of different people, face images with unsuitable quality, pose, etc. Such false matches or low-quality images may offset the results of personality analysis per the present invention.

According to the present invention an automated process select only appropriate images from the search results.

Face recognition technology may be used to ensure that all selected images depict the same, correct person. In the case that one or more images of the target person have been tagged manually, a face recognition engine 220 will pick face pictures of the same person from the face results. Alternatively, in the lack of a tagged key image, an automatic grouping process based on face similarity will group image subsets where each subset corresponds to a single person. The largest similarity group shall belong to the person of interest with higher probability. Alternatively, the largest groups shall be inspected by a human who will select the appropriate subset. An automatic grouping process can be implemented by using techniques such as disclosed by X. Zhang, Y. Gao, Face recognition across pose: A review, Pattern Recognition 42 (2009) 2876-2896.

These similarity-filtered search results are further analyzed to select images of high quality, of neutral expression and of appropriate pose (for example full frontal images and side profile images). Face quality module 230 uses quality metrics such as face size, face image sharpness to select face select images of good quality. Other measures may include face visibility or level of occlusion—such as from glasses, hair style. Such analysis can be implemented by using techniques such as disclosed by Y. Wong et al., Patch-based Probabilistic Image Quality Assessment for Face Selection and Improved Video-based Face Recognition, CVPR 2011.

A possible embodiment of step 230 can use the landmark detection process using the number of detectable landmarks as a face quality metric as well as for pose detection and subsequent alignment.

Face expression analysis modules 240 further selects face images of neutral expression, in order to avoid biased results of face personality analysis due to extreme expressions. Such expression analysis can be implemented by using techniques such as disclosed by B. Fasel and J. Luettin, Automatic Facial Expression Analysis: A Survey (1999), Pattern Recognition, 36, pp. 259-275, 1999.

Pose filtering step 250 selects and classifies images of the preferred full frontal or side profile pose. In the case that not enough images are available with these poses initially, pose rectification step 260 is employed (see description with respect to module 130 hereinabove).

Figure 15:
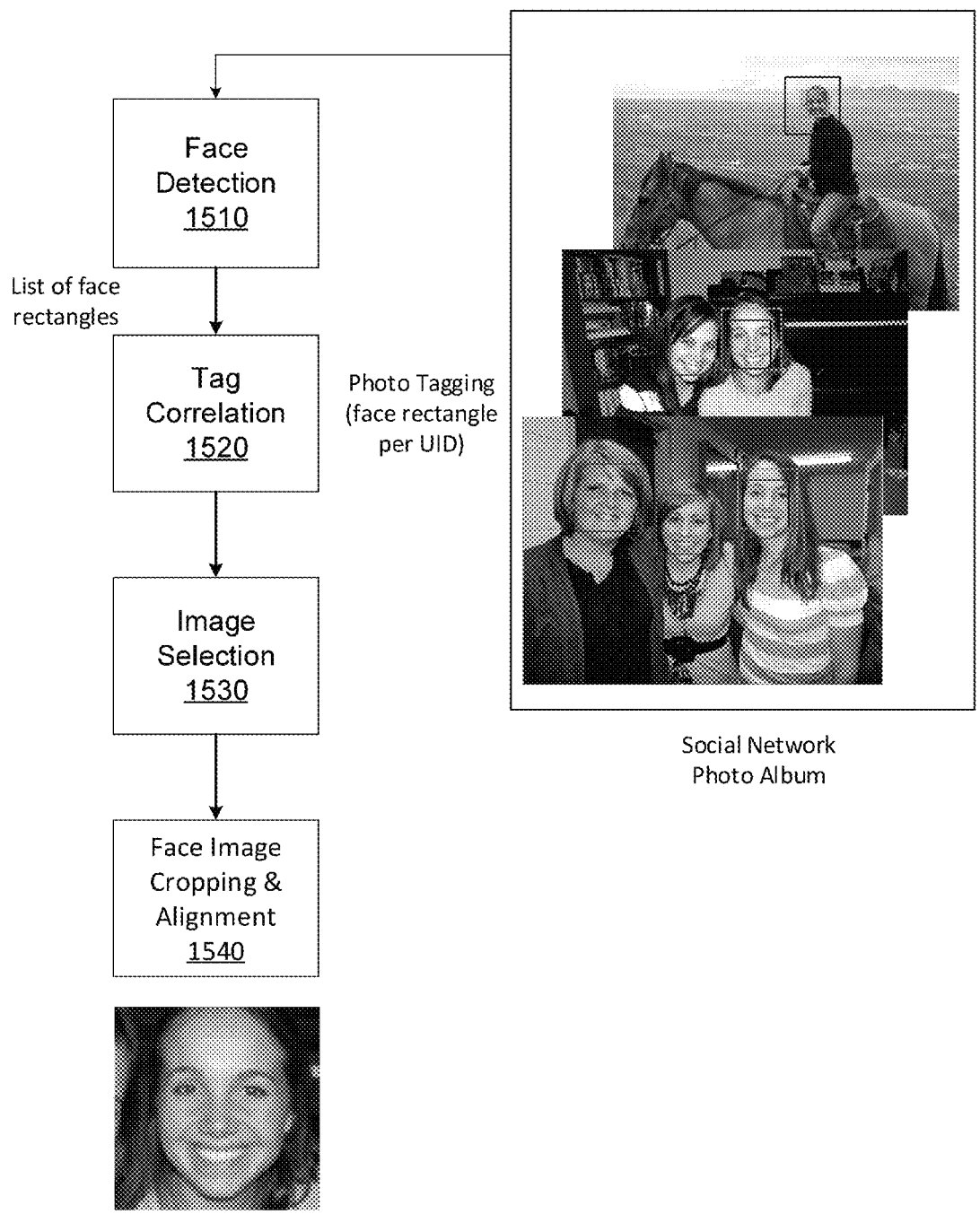
FIG. 15 depicts a face harvesting process, according to an embodiment of the present invention.

Social networks such as Facebook are a common source for harvesting human faces. Many Facebook images are provided with tags. As one example, the tagging is provided as a list of image rectangles labeled by ID of users, where such rectangles ideally intersect with the respective users' face regions. FIG. 15 depicts a face harvesting process according to an embodiment of the present invention.

Given the User ID (UID), selected (e.g., by minimum file size) or all images are downloaded from the user's online photo album. Face Detection module 1510 extracts all detectable faces in each image, associating a bounding rectangle with each detected face. Then, the photo tagging information, provided as a rectangle per UID is correlated by Tag Correlation 1520 to find intersection with a detected face. Once all user photos are extracted, they undergo a selection process as described in FIG. 2 to provide the best image(s) to the training process. Specifically, steps 230, 240, 250 and optionally alignment step 260 are used.

When the source of face images is a video image sequence, the steps of quality filtering 230, expression filtering 240 and pose filtering 250 are conducted on multiple images from the sequence to select good images. Still, the selected images may be highly redundant, as if sequence dynamics are slow. In such a case, key-frame selection method as known in prior art may be used to reduce the number of face images. Alternatively, one can use face similarity metrics to detect redundancy and select a reduced number of representative face images.

When multiple images of same person are suitable for analysis, such multiple images can be combined to increase the accuracy of said analysis. As one example of combining multiple images, the images are analyzed independently, producing a set of trait values for each image. Then a statistical process such as majority voting or other smoothing or filtering process is applied to produce a robust statistical estimate of said trait value.

Figure 3:
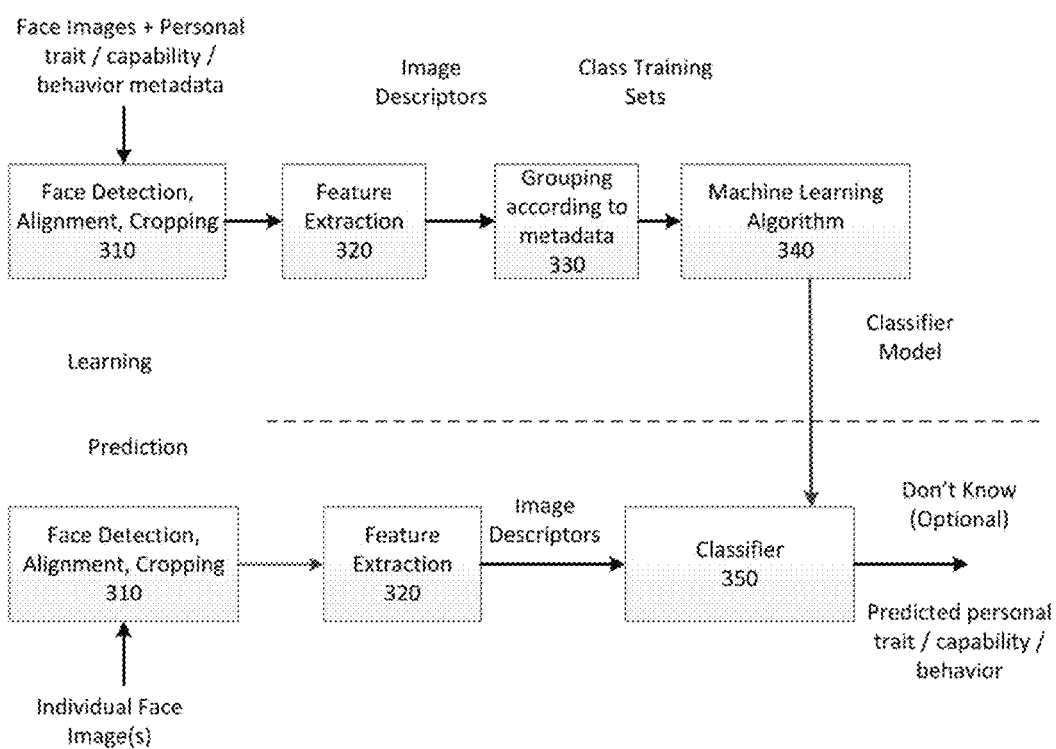
FIG. 3 schematically illustrates a high-level framework for personal trait, capability or behavior learning/training and then prediction/classification, according to an embodiment of the invention.

FIG. 3 schematically illustrates a high-level framework for personal trait, capability or behavior learning/training and then prediction/classification, according to an embodiment of the invention. In the description that follows we present specific embodiments of the steps in that framework.

As one specific example, we construct a classifier to differentiate between near eyebrows and far eyebrows. Near eyebrows are usually associated with a person comfortable with close range interaction, either verbal or physical, for example a sales person, a martial arts fighter, etc.

A first step is collecting examples of face images of persons with near eyebrows and a comparable collecting process for persons with far eyebrows.

Following face detection, alignment and cropping step 310, we have 2 sets of face images normalized at least according to the following parameters: image size, face image size, face location and orientation. The training process typically requires hundreds to low thousands of images of each set for the purpose of training and testing the methods described below. Each of these images is associated with metadata characteristics of human personality.

Before applying step 320 "Feature Extraction", we must select/design a descriptor that will be invariant to illumination, skin color, and fine image structures and so on. There are several possibilities. Some of the best known descriptors for image-based classifiers are SIFT/LBP/HOG.

SIFT=Scale Invariant Feature Transform extracts from an image a collection of feature vectors, each of which is invariant to image translation, scaling, and rotation, partially invariant to illumination changes and robust to local geometric distortion. Lowe, David G. (1999), "Object recognition from local scale-invariant features", Proceedings of the International Conference on Computer Vision 2, pp. 1150-1157.

LBP=Local Binary Pattern

To compute the LBP descriptor, divide the examined window into cells (e.g. 16×16 pixels for each cell). Then, for each pixel in a cell, compare the pixel to each of its 8 neighbors (on its left-top, left-middle, left-bottom, right-top, etc.). Follow the pixels along a circle, i.e. clockwise or counter-clockwise. Where the center pixel's value is greater than the neighbor's value, write "1". Otherwise, write "0". This gives an 8-digit binary number (which is usually converted to decimal for convenience). Compute the histogram, over the cell, of the frequency of each "number" occurring (i.e., each combination of which pixels are smaller and which are greater than the center). Optionally normalize the histogram. Then, concatenate normalized histograms of all cells to the feature vector for the window. For example, see T. Ojala, M. Pietikäinen, and D. Harwood (1996), "A Comparative Study of Texture Measures with Classification Based on Feature Distributions", Pattern Recognition, vol. 29, pp. 51-59.

HOG=Histogram of Oriented Gradients (HOG) counts occurrences of gradient orientation in localized portions of an image. "An HOG-LBP Human Detector with Partial Occlusion Handling", Xiaoyu Wang, Tony X. Han, Shuicheng Yan, ICCV 2009.

According to specific embodiment, the SIFT descriptor is used and specific details are available below. Note that the descriptor is composed of edges in patches from all parts of the face—thus the same descriptor can be used to classify traits associated with different parts of the face such as lips, eyes, and nose. The learning algorithm (e.g., SVM in a specific embodiment) will weigh the relevant coordinates for a specific trait according to relevant patches that best describe it.

In a specific embodiment, according to the SIFT descriptor, we extract 150 image "windows" from the normalized face image which undergoes a process of spatial gradient computation. Each image window is then divided into 4*4 sub-windows and the gradient content of each window is represented by a histogram of gradient orientation quantized to 8 directions. So, initially, the descriptor dimension is 150*4*4*8=19200. Such a high dimension can make the classification computation difficult, so we reduce each of the 150 vectors of dimension 128 to a vector of dimension 10 using Principal Component Analysis (PCA), to obtain a total dimension of 1500 per face image. Alternatively, a different image descriptor such as LBP or HOG might be used.

In a different embodiment, a face landmark detection algorithm such as the one commercially available from Luxand Inc. (see http://www.luxand.com) in Software Development Kit (SDK) form to detect dozens of tagged face landmark from a feature. If for example, 50 landmarks are detectable, then with normalized (x,y) value for each landmark, a descriptor of dimension 100 is obtained.

After the feature extraction, at step 330, the images are grouped into training groups according to their associated metadata characteristic of human personality.

We now describe step 340, applying a machine learning algorithm to the training images and corresponding descriptors, labeled according to metadata (e.g. low eyebrows vs. high eyebrows) to train a classifier 350. The description will be based on the technique of Support Vector Machines (SVM), but different "machine learning" algorithms can also be used, such as Cortes, Corinna; and Vapnik, Vladimir N.; "Support-Vector Networks", Machine Learning, 20, 1995.

Figure 4:
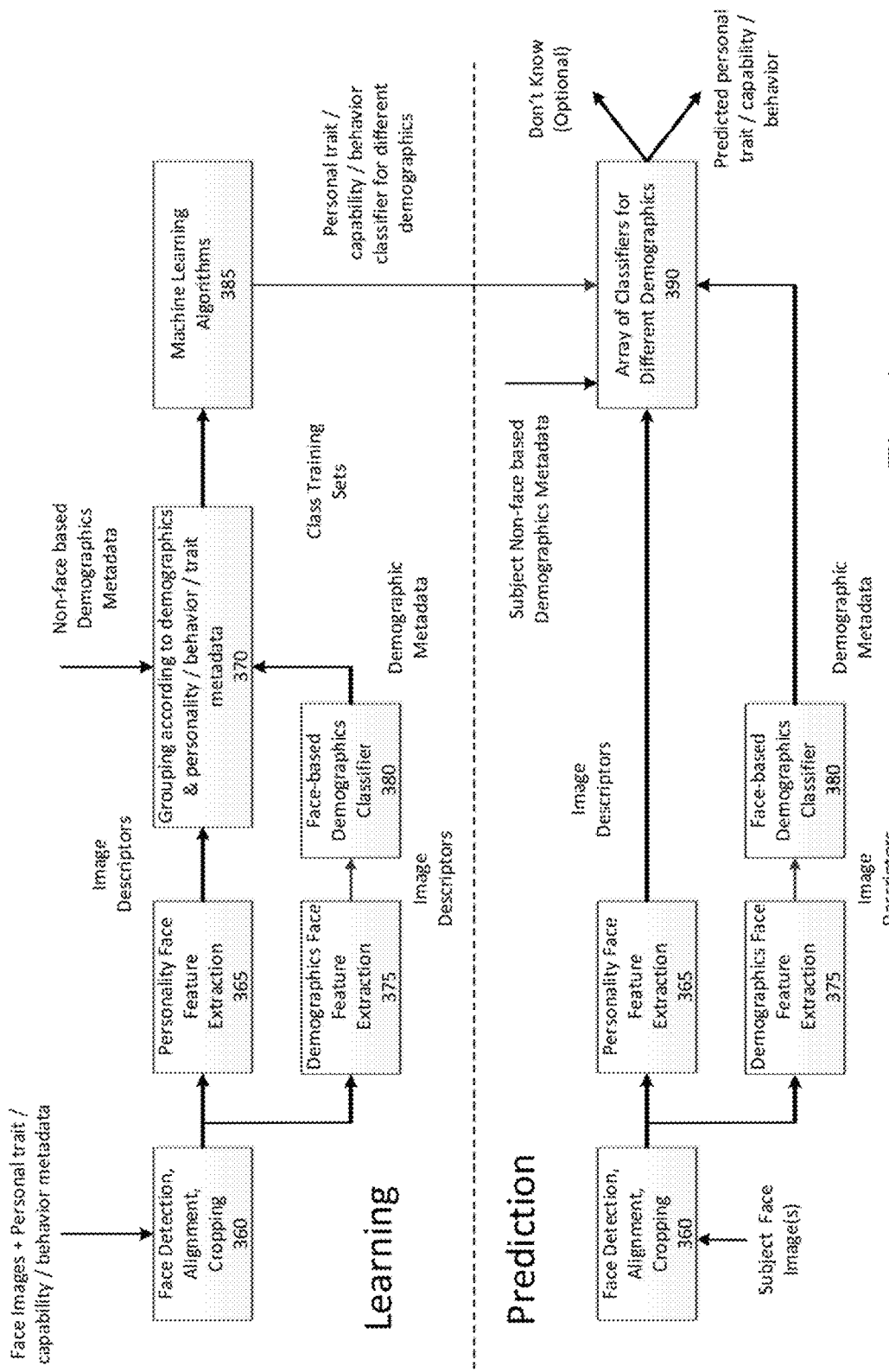
FIG. 4 schematically illustrates a high-level framework for personal trait, capability or behavior learning/training and then prediction/classification with respect to face-based demographic classification, according to an embodiment of the invention.

Using SVM the system tries to find a classifier in 1500d that will separate between, for example, the faces labeled as having close eyebrows and faces labeled as having far eyebrows (from the eye). The most common form of SVM: the binary classifier is designed for a 2 group case. For the case of personality/capability/behavior analysis the system often needs 3 levels of magnitude: low/balanced/high. There are several options for that:

Compute a threshold "t" such that:
  Classifier output>=t is assigned the highest magnitude (3)
  Classifier output between −t and t is assigned the middle magnitude (2)
  Classifier output below −t is assigned the lowest magnitude (1).
Multi-class SVM (one-versus-one) using voting of several binary SVM. To identify 3 magnitudes for a certain trait we need to train 3 binary classifiers:
  a classifier that will separate between images with magnitude 1 and 2;
  a classifier that will separate between images with magnitude 3 and 2; and
  a classifier that will separate between images with magnitude 1 and 3.
Now, for a new image we will activate all 3 classifiers and check which magnitude got maximum votes.
  Observing that the task at hand it is not an ordinary multi-class problem as we have order between the classes: Magnitude 1 is lower than magnitude 2 and this one is lower than magnitude 3.
  Therefore, we will use ranking—SVM-rank is trained by giving it pairs (of images) and tag which one is bigger (according to a certain trait we want to work on). In this specific example, the classifier is trained to detect a "longer than" relation between 2 images. Thus, given 2 face images the classifier shall decide which has longer distance from the eyebrows to the eyes.
  Another option is using Regression—deriving a function that will map the descriptor to the level of magnitude of the trait. SVM is applicable to the case of regression, maintaining all the main features that characterize the maximal margin algorithm: a non-linear function is learned by a linear learning machine in a kernel-induced feature space, e.g., see Cristianini and Shawe-Taylor (2000).
  Kernel method: mapping the descriptor from a general set S into an inner product space V (equipped with its natural norm), without ever having to compute the mapping explicitly, hoping that the observations will gain meaningful linear structure in V. The term inner product space refers herein to a vector space, in linear algebra, with an additional structure called an inner product. This additional structure associates each pair of vectors in the space with a scalar quantity known as the inner product of the vectors. Possible mapping include non-linear function such as:
    polynomial: $(gamma*u'*v+coef0)^{degree}$
    radial basis function: $exp(-gamma*|u-v|^2)$
    sigmoid: $tan\ h(gamma*u'*v+coef0)$ FIG. 4 schematically illustrates a high-level framework for personal trait, capability or behavior learning/training and then prediction/classification with respect to face-based demographic classification, according to an embodiment of the invention. In the description that follows we present specific embodiments of the steps in that framework.

Face-based demographic classification (gender, age, ethnicity) is known in prior art. The idea is that improved personality trait/behavior/capability classification may benefit from demographic segmentation. For example, the system collects images of male researchers and female researchers, doing the same with a control group, which in this context may comprise of people that are known not to be researchers.

Now we train a classifier for male researcher and one for female researcher (and of course verify during development that we benefit from such segmentation).

For training, the source for demographics data may be non-face-based demographic metadata (e.g., social network such as from Facebook profile) or face-based demographic data (either human-tagged or machine tagged) as extracted and classified by blocks 375 and 380. The face detection, alignment and cropping (block 360) and the personality face feature extraction are similar in their functionally to blocks 310 and 320 as described with respect to FIG. 3 hereinabove. Grouping according to demographics and personality/behavior/trait metadata (block 370) is done in a similar manner to block 330 as described with respect to FIG. 3 hereinabove.

During prediction, the subject face image undergoes face-based demographic classification (blocks 375 and 380). Alternatively, non-face-based demographic data is retrieved (if available). Then the demographic-specific personality trait/behavior/capability classifier is applied by array of classifiers (block 390) and according to the machine learning algorithm (block 385).

Computing the Threshold

Figure 6:
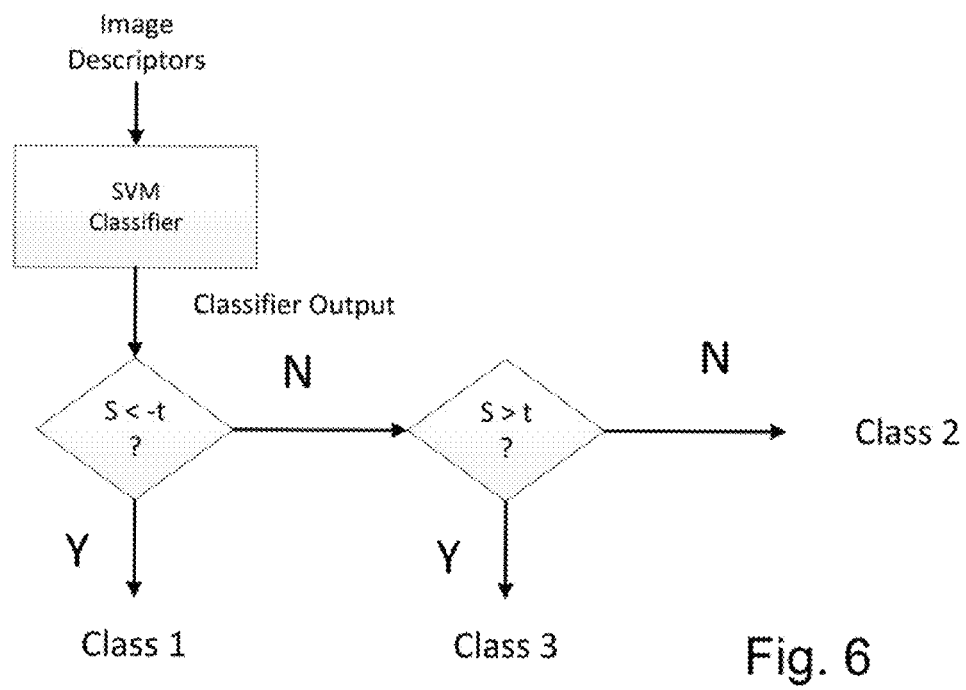
FIGS. 6 and 7 schematically illustrate a threshold-based decision strategies in 2-class and 3-class classification problems, according to embodiments of the invention.
Figure 7:
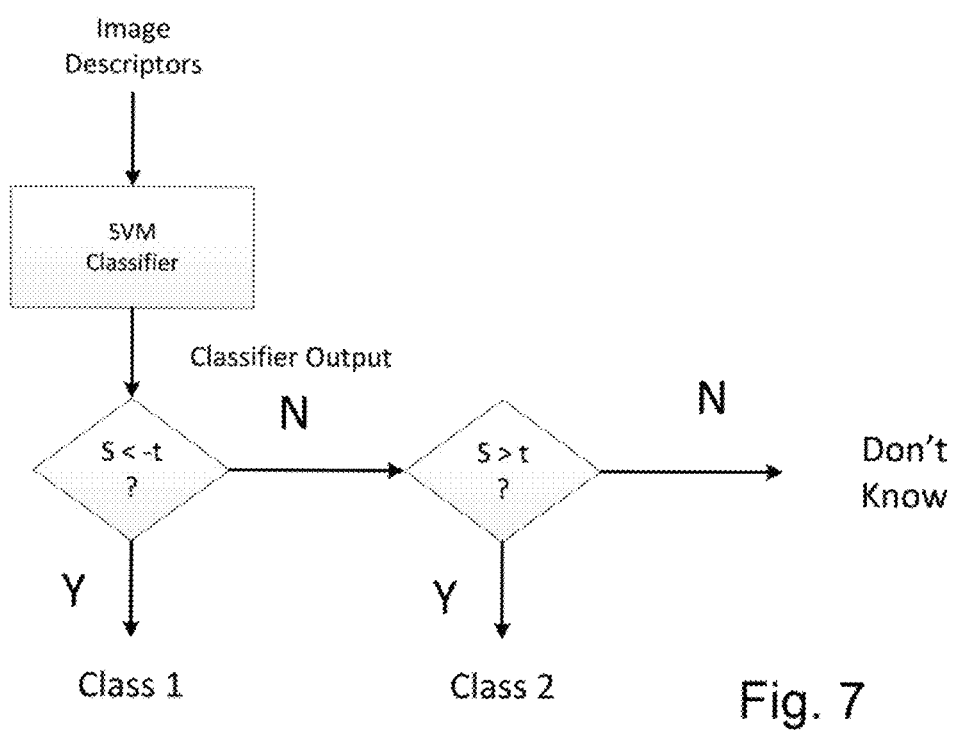

According to the embodiments described above, a threshold is used to implement a 3-class decision. In a different embodiment of a 2-class case a threshold is used when it is not mandatory to classify all faces and it is important to reduce the classification error. Consider for example tagging specific members of a group (e.g., a loyalty club) as early adopters of new products and technology, for the purpose of mailing to them a product sample, an invitation to an event etc. When such marketing method requires an investment in every single prospect, it is crucial to spend the budget wisely. Assume that the entire audience is a very large. Hence, a possible approach may be to assign certain members of the audience a "Don't Know" tag, even if 50% (in an extreme case) of the audience are not classified at all— provided that the remaining audience is classified at 90% accuracy. To implement that strategy we select a threshold t such that:

For a classifier output >(+t) we assign class 1 (see FIGS. 6 and 7);

For a classifier output <(−t) we assign class 2 (see FIGS. 6 and 7); and For classifier outputs between (−t) and (+t) the system produces a "Don't Know" undecided output (see FIG. 7).

The threshold can be calculated as the minimum result of the classifier on the training positive examples. It also can be asymmetric threshold above and below the classifier. In that case we can also calculate the result on the negative example and look for the closest one to the margin. It can also be any value between the closest and the furthest results of the training—depends on the amount of "Don't Know" we want to allow.

FIGS. 6 and 7 depict the threshold-based decision strategies in 2-class and 3-class classification problems, according to aforementioned threshold selection strategy. The SVM classifier is indicated by numeral 710.

According to FIG. 6 the decision strategy works as follows:

In step 711 the system check if the classifier output S is smaller than the threshold (−t). If yes, then class 1 is assigned to the classifier. If no, in step 712, the system checks if the classifier output S is bigger than the threshold (+t). If yes, then class 3 is assigned to the classifier, and if no then class 3 is assigned to the classifier.

According to FIG. 7 the decision strategy works as follows:

In step 711 the system check if the classifier output S is smaller than the threshold (−t). If yes, then class 1 is assigned to the classifier. If no, in step 712, the system checks if the classifier output S is bigger than the threshold (+t). If yes, then class 2 is assigned to the classifier, and if the classifier outputs a value between (−t) and (+t) then "Don't Know" is produced.

To achieve high classification precision, a few hundred training samples are required for each trait and magnitude. For certain uncommon traits it may be difficult to collect an appropriate amount of training samples. According to a specific embodiment, a 2-step process initially learns from a relatively small number of samples, forming a low/medium accuracy classifier. Then using the initial classifier examples can be collected, manually clean the mistakes and strengthen the model by training a classifier from a much higher number of samples.

Figure 8:
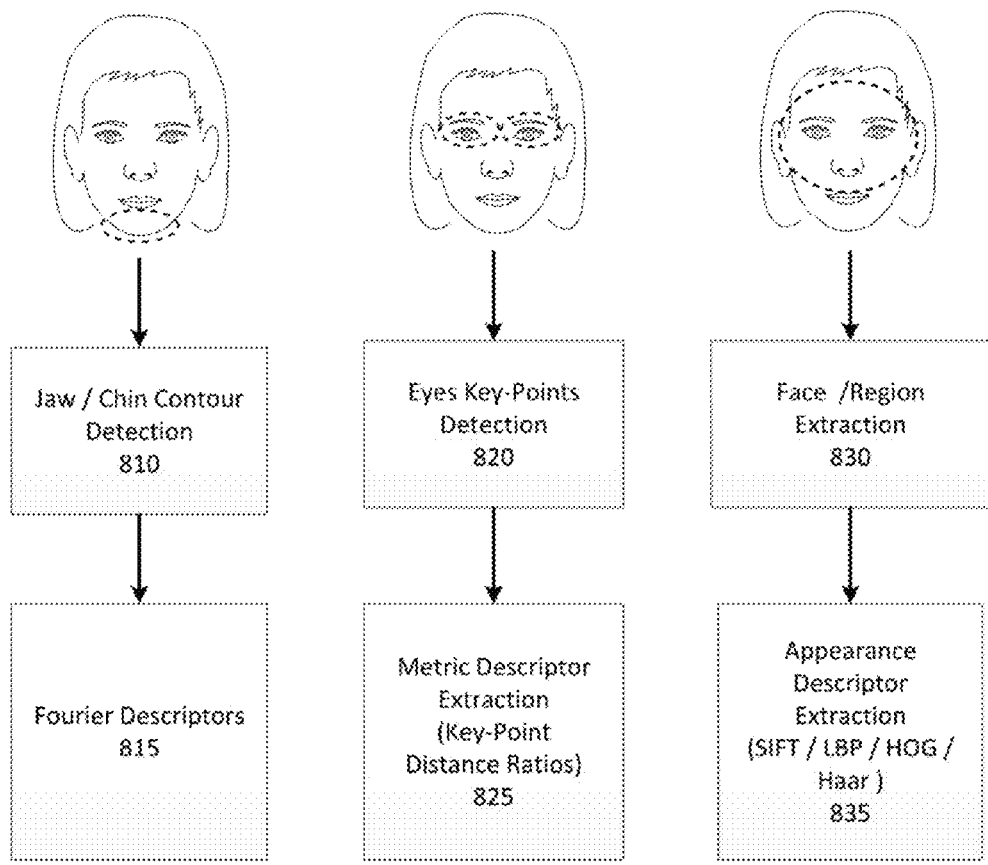
FIG. 8 illustrates applicable schemes for the personality feature/descriptor extraction, according to an embodiment of the present invention.

FIG. 8 illustrates applicable schemes for the personality feature/descriptor extraction, according to an embodiment of the present invention.

According to one specific embodiment, (830, 835) face regions or the entire face are classified by appearance based methods that use no a priori knowledge on the data present in the image. Instead, they try through statistical analysis of the available dataset (either an image or image characteristics database) to extract the different variation modes of the database. Several appearance-based descriptors include SIFT, LBP or HOG transforms. In another embodiment, Haar features are used to represent a face. The Haar wavelets are a natural set basis functions which encode difference in average intensities between adjacent regions. These features have been found useful in face detection and can be easily computed with the Integral image using the differences of the sum of the pixel values within neighboring rectangular regions. As this set of over-complete, the potential number of such features is huge and a bootstrapping process may be required to select the features. For example, see "A general framework for object detection Computer Vision", 1998. Sixth International Conference on (1998), pp. 555-562 by C. P. Papageorgiou, M. Oren, T. Poggio.

Other face regions associated with personality traits are better described with contour-based methods (810, 815). For example, traits associated with the jaw/chin and with the nose side profile contour. The contour may be represented by Fourier Descriptors. For example, see C. S. Lin and C. L. Hwang, "New Forms of Shape Invariants from Elliptic Fourier Descriptors", Pattern Recognition, vol. 20, no. 5, pp. 535-545, 1987. Additional descriptors are suited for shape and contour: S. Belongie and J. Malik (2000). "Matching with Shape Contexts", IEEE Workshop on Content based Access of Image and Video Libraries (CBAIVL-2000). Chamfer distance: [D. M. Gavrila and V. Philomin, Real-time Object Detection using Distance Transforms, Proc. of IEEE Intelligent Vehicles Symposium, pp. 274-279, Stuttgart, Germany, 1998. Edges fragments—Incremental learning of object detectors using a visual shape alphabet Oplet, Pinz, Zisserman (2006).

Other face structure descriptors can be describes by simple normalized metrics (820, 825). For example, consider the height variation of the inner corners of the eyes. Once the face image is rotated to canonic position, the height difference between the eye corners is detected and normalized by the distance between these corners.

Once features or descriptors are associated with each personality trait, a trait classifier is assigned to each descriptor/trait. The classifier depends on the specific representation of said features or descriptors. The training process is usually done offline, and therefore memory or computation time requirement are relaxed. According to the bottom part of FIG. 3, during prediction, an unknown input image (or set of images depicting the same individual) undergoes similar detection, alignment and cropping step 310 as in the learning phase. The normalized image is passed through a feature extractor stage, generating features/image descriptors that are then passed to the classifier. According to one embodiment of the present invention, is classifier is SVM.

The output of the classifier may be a tag or a label which is a prediction of the metadata (with optional magnitude) from the domain of metadata supplied with the training images in the learning stage. In one example the input metadata during learning tags the membership of a person to a specific group ("researcher", "Poker player", "early adopter", "economical buyer") and the classifier output provides an indication of whether the personality traits and capabilities of the individual are compatible with those of the specific group. The query phase, for all traits that use the same descriptor and are classified by linear classifier, can be calculated at once very fast by one matrix multiplication (combined from all linear classifiers).

Personality and Health Profiling

According to one embodiment of the invention, the metadata contains at least one trait from a list of personality traits as known in psychology. As a specific example, the Big Five personality traits are five broad domains or dimensions of personality that include: openness, conscientiousness, extraversion, agreeableness and neuroticism. Such metadata for the training group may be obtained through psychological questionnaires and interviews as well as self and peer ratings [Goldberg, Lewis R. "The development of markers for the Big-Five factor structure." Psychological assessment 4.1 (1992): 26.]

Given a large training database of individuals, tagged with Big-5 trait values, a classifier for each of these trait values is constructed according to the present invention. Consider for example the extraversion trait and assume that through the psychological questionnaires, each individual of the training is assigned a numerical value between 0 and 100 where low scores indicate high-level of introversion and high scores denote a high level of extroversion.

Our training group will consist of a group of individuals with a low score (say 0-30) and a comparable group with high scores (70-100). Face images are then collected and analyzed according to the present invention, resulting in a face-based extraversion trait classifier. Afterwards, the classifier can be applied to the general population and predict low/high extraversion trait values using face images only, without the cost and effort of having the general population fill questionnaires or conduct interviews/peer ratings.

According to an embodiment of the present invention, a psychological profile is constructed from multiple classifiers, yielding for example the complete big-5 profile of an individual using his/her face image only. According to another embodiment of the invention, the metadata contains one or more elements of a health profile and classifiers are generated to predict one's health elements—to the extent that such elements are proven to be predictive of such elements.

Crowd Source

According to a further embodiment of the present invention, crowd source is used to improve the system's analysis capabilities. According to one embodiment, a person performs analysis of himself or of a person he know well. When the description is presented to that person he is asked to agree/disagree (could be level from 1-5) to each trait. Then, the specific face region(s) associated with each trait (with high/low agreement scores) are used as positive/negative examples for the training process.

Occasional such inputs may be biased or erroneous, however assuming that most such inputs will be correct/authentic, the classification system will exhibit a "learning" curve.

Generating Rich Descriptions

Natural Language Generation (NLG) is the process of converting a computer based representation into a natural language representation. In NLG the system needs to make decisions about how to put a concept into words. More complex NLG systems dynamically create texts to meet a communicative goal. This can be done using either explicit models of language (e.g., grammars) and the domain, or using statistical models derived by analyzing human-written texts.

According to the present invention, personality analysis and interaction recommendation are converted from their computed attributes and values into a verbal description using NLG module.

Figure 9:
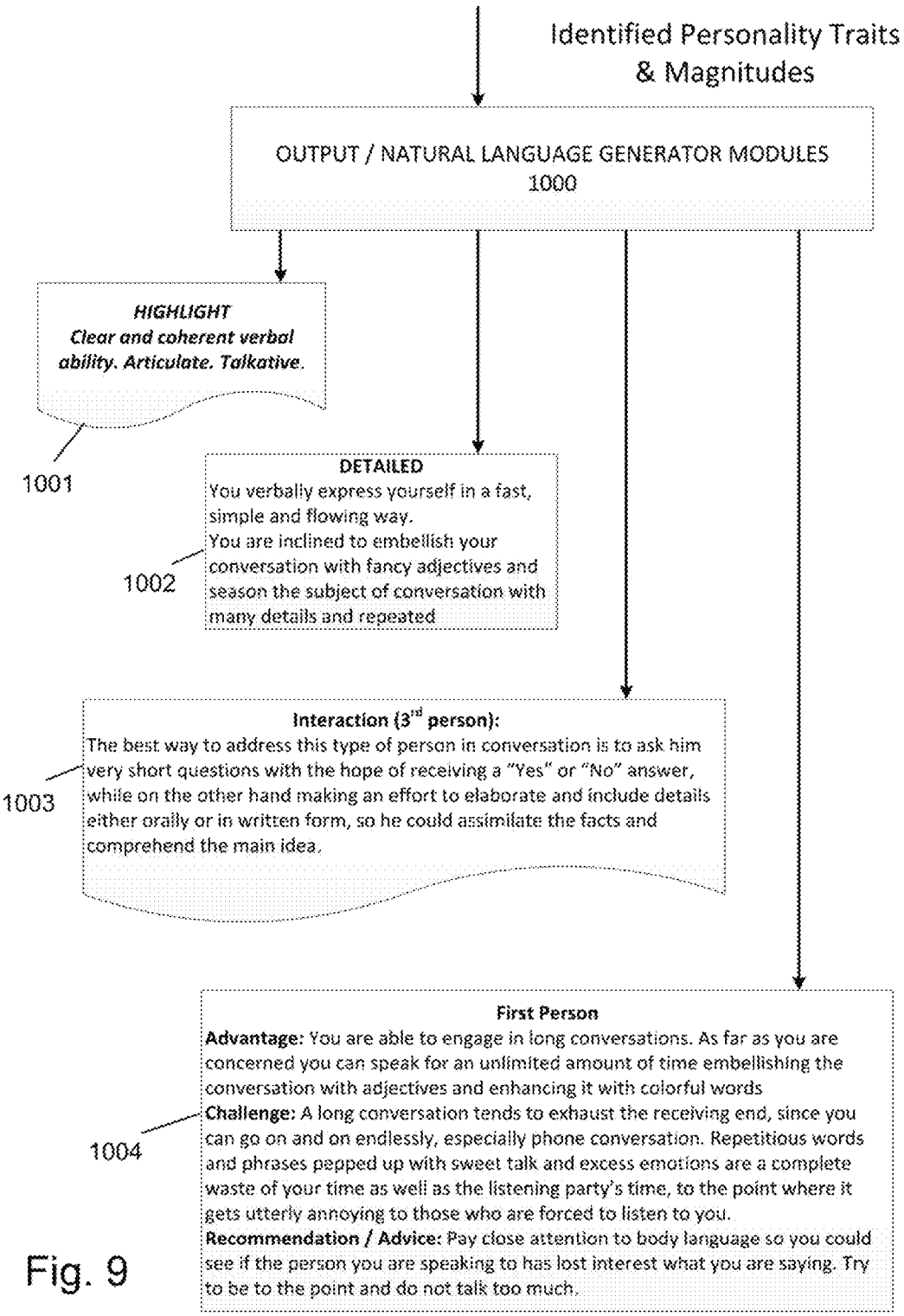
FIG. 9 shows a presentation of the system's outputs as a result of an identified personality traits and magnitudes.

FIG. 9 shows a presentation of the system's outputs as a result of the identified personality traits and magnitudes. An output/NLG module(s) 1000 is used to generate the system's output.

In accordance with the embodiments of the present invention, personality traits and capabilities identified and assigned values/magnitudes, trigger the generation and output (display/file/message) of short form descriptions (denoted as HIGHLIGHT and indicated by numeral 1001). For example, the HIGHLIGHT descriptions may include terms such as clear and coherent verbal ability, articulate, talkative, etc.

Furthermore, NLG engine generates 1000 a:
Detailed description of the specific trait—denoted as DETAILED and indicated by numeral 1002. The detailed description may include expression such as "you verbally express yourself in a fast, simple and flowing way", "you are inclined to embellish your conversation with fancy adjectives", etc.

Best practice of interaction (3rd person advice)—denoted as INTERACTION and indicated by numeral 1003. For example, the INTERACTION may provide information such as: "The best way to address this type of person in conversation is to ask him very short questions".

Recommendations to 1st person—denoted as First Person and indicated by numeral 1004. The recommendation may include one or more advantages (e.g., "you are able to engage in long conversations"), challenges (e.g., "a long conversation tends to exhaust the receiving end, since you can go an on endlessly"), and recommendations/advices (e.g., "pay close attention to body language so you could see if the person you are speaking to has lost interest in what you are saying").

All the above will be better understood through the following illustrative and non-limitative examples. Specific embodiments of the present invention allow its usage to facilitate interaction in multiple domains and applications. Such applications may include: Robotics, Sales Improvement, Coaching, Smart CRM, Negotiation Tool, Personal advertising, HR recruitment, Teaching Aid, Criminology Analysis, Personal Gaming, Meeting Intelligence, Career Guidance, etc.

We describe below several embodiments of machine-assisted interactions in the social and business domains. It should be straightforward for someone skilled in the art to extend the described embodiments for additional domains and interactions.

Video Chat/Conference

Video chats/calls/conference are a very popular tool for remote social and business interaction with people. Multiple face images of the participants are naturally available but most participants lack the knowledge to "read" the information embedded in these images and/or induce the desired interactions with the other participants.

Figure 10:
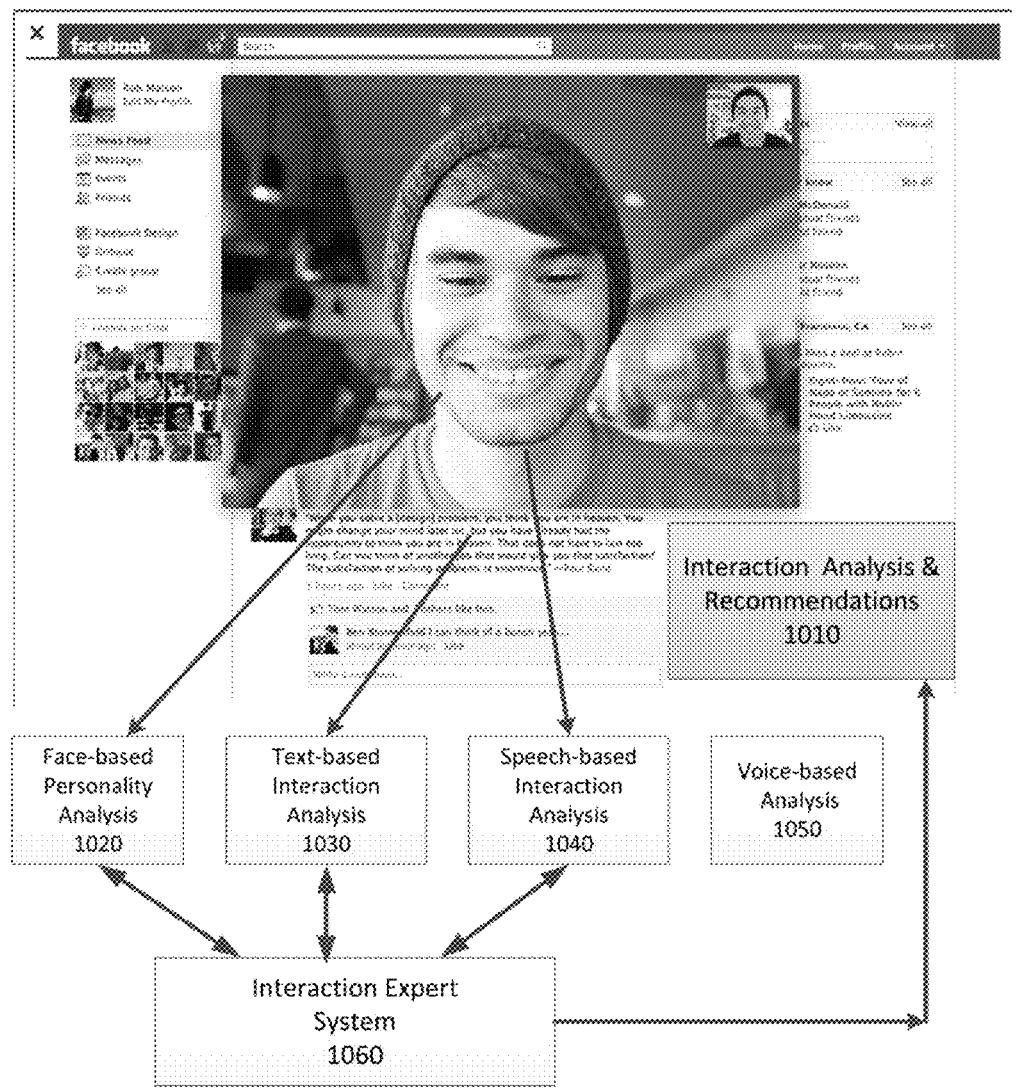
FIG. 10 depicts an exemplary video chat/conference system enhanced by personality analysis and interaction recommendations, according to an embodiment of the invention.

FIG. 10 depicts an exemplary video chat/conference system enhanced by personality analysis and interaction recommendations. All 3 levels of interaction are analyzed by the system of the present invention.

A face-based personality analysis module generates description of personality trait as described in the present invention. Face images are captured from video during the call itself and optionally stored for later interactions. Additionally, a name search engine, optionally augmented by face recognition, as described in FIG. 2 hereinabove, brings in additional pictures of the same person, with better quality, controlled pose, illumination etc.

The personality analysis module according to the present invention 1020 presents personality traits of the person/persons participating in the chat/video conference.

As most video chat/conference systems provide means to type textual messages, to all participants or to selected participants, a text-based interaction analysis module 1030 generates analyzes the textual interaction during the chat/conference.

A speech-based interaction analysis module 1040 includes a speech recognition module as known in prior art, converting any verbal communication to written communications, to be presented on the screen and also analyzed for content and meaning. Additionally, the audio signal will be analyzed by voice-based analyzer for personality/situation/emotion cues such as loudness, stress, pauses before and after certain words, etc.

An interaction expert 1060 system combines cues from all 3 interaction analysis module into interaction recommendations—generic and content-based. Moreover, the expert system guides the specific modules above in what to analyze and what to present. For example, the topic of the current discussion, as identified from speech recognition and text analysis, will select what personality traits and interaction recommendation to present at any given moment.

From the user's point of view, interaction analysis & recommendations display 1110 is integrated within the video chat/conference application.

CRM Integration

According to one embodiment, the present invention facilitates Customer Relationships Management (CRM). Current CRM systems use technology to organize, automate, and synchronize business processes—principally sales activities, but also those for marketing, customer service, and technical support, in order to find, attract, and win new clients, service and retain those the company already has, entice former clients to return, and reduce the costs of marketing and client service.

From the aspect of utilizing customer information to facilitate the above processes, Current CRM systems are limited to information furnished by the customer or prospective client, through customer registration, past transactions or inquiries, and optionally information manually entered by company personnel documenting past interactions.

According to the present invention, a personality profile is generated from client images as collected from the Internet or provided through video conference interactions. Then, when a specific interaction with the customer is planned, the system would present recommendations/best practices for that interaction.

This would assist remote customer support, sales and service personnel to better interaction with a prospective/current/dissatisfied customer, as a standalone application or integrated with intelligent online engagement solutions using chat, such as those provided by LivePerson.

Personal Advertising

According to another embodiment, the present invention facilitates Personal Advertising. The infrastructure for adaptive messaging does exist. For example TV set-top boxes may display different messages at different households at the same time-slots. Also personal advertising fit seamlessly into web content and any non-linearly consumed content. Such messages may be promoting different products of different vendors, different products of same vendor or same product, with different ways of presenting the messages to different audiences.

The challenge remains how to select the best message to show at any given time.

Prior art techniques collect information on user preferences by tracking web surfing history, TV viewing habits and any information furnished by the user. For anonymous applications such as out-of-home advertising, non-cooperative techniques identify external characteristics such as age group and gender. In multi-user environment, such as a TV in the living room, user identification methods based on face recognition or on identification of viewing habits.

However, all these techniques gather and utilize external characteristics and fail to infer "internal" user traits and hence preferences. According to the present invention, face images of said user are analyzed to predict his or her personality traits and recommended interaction. Then a message is chosen from a collection of messages or customized in a manner that increases the relevance of the message to the viewer's personality.

According to a specific embodiment of the present invention users/viewers are classified into one or more types, such as "buyer types", for example a type from the list "early adopter", "me too", "economical" and "sensitive". In certain embodiments it may be valuable to designate a "primary" buyer type but also a "secondary" buyer type which yields better selectivity/targeting.

In one embodiment, the user behavior is tracked and used to provide additional information to the initial classification. So for example if one "early adopter" buyer shows more interest in new experiences and another "early adopter" buyer shows more interest in new technologies, such "behavioral" information may be added to the initial "personality" buyer type/profile and used for better conversion down the road.

Furthermore, once the system collects enough examples for each of the "behavioral" sub-groups of "early adopter", one may apply training algorithm from the field of pattern recognition or machine learning, as described in the present invention and fine-tune personality types.

In an anonymous situation, such as out-of-home displays, user face images are captured by a connected camera and analyzed per the present invention.

When the user can be identified, previously captured face images can be processed as described above. Alternatively, previously generated personality descriptors can be retrieved from a user database.

Integration with Wearable Computing Device

According to a further embodiment of the present invention, a wearable image capture device such as Google Glass is worn by the user who captures images of persons of interest in the physical environment of the user. The device is preset to one or more of applications such as selecting and approaching a tentative client for product sales or picking up a partner.

Once the device identifies that the user focuses on a certain "target" person, as can be defined by keeping that person's image in the center of the device field of view for a minimum preset duration, the device captures face images of the target person. The device then selects at least one image for personality analysis. Generated traits are presented in concise form on the display. Optionally, recommendations for interactions are presented. Such recommendation may be sales/engagement tactics in a shopping venue ("mall"), opening or introduction phrases in a party or a bar, etc.

The above can be implemented with any mobile computing device with integrated camera, such as smartphone, tablet, iPod, etc. One can perform the complete analysis in the device, or compute the descriptors and send them to a remote server for the actual classification. In either case no image or other personally identifying information is sent outside the device, thus preserving privacy.

Figure 11:
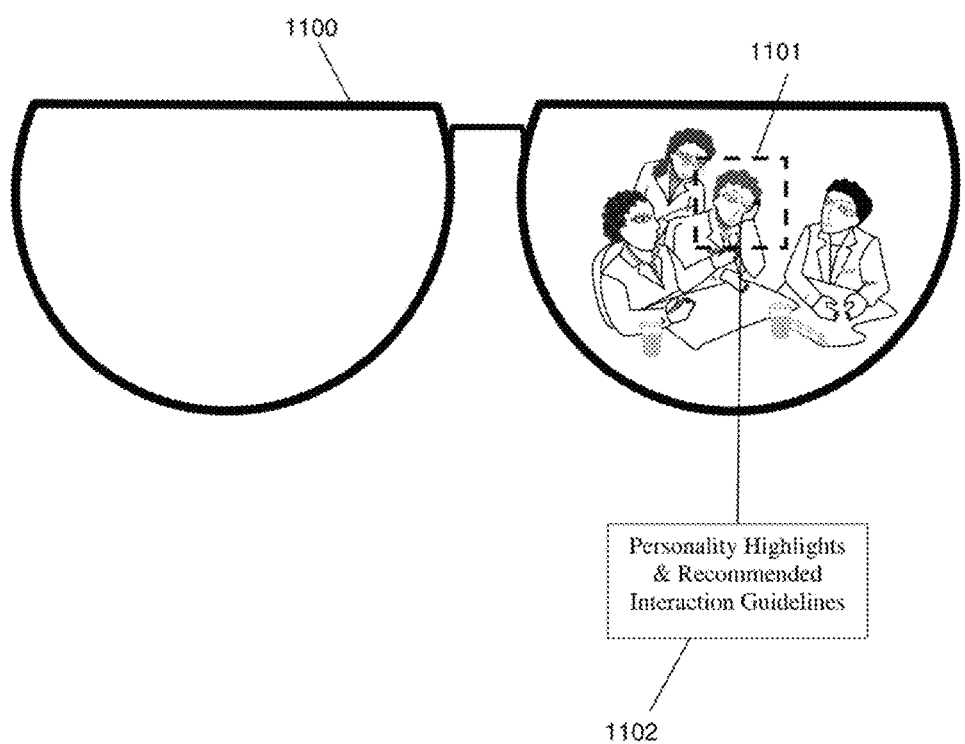
FIG. 11 depicts an exemplary integration of personality analysis in a wearable computing device arrangement, according to an embodiment of the invention.

FIG. 11 depicts a possible integration of personality analysis in such a wearable camera/computing device arrangement 1100. When the personality analysis mode is activated, the device 1100 detects the person of interest—for example occupying the center of the field of view (as indicated by the dotted square 1101). Then after a short duration, when a one or more image of sufficient quality have been captured and the personality analysis is complete, the system will present a short (bullet-form) summary of that person traits, as well as recommended interaction guidelines as indicated by numeral 1102.

Robots

Robots are designed to address certain aspects of marketing and customer care, among other tasks. Robot interaction can be as simple as greeting customers in one of several languages [e.g., see the "Toshiba's humanoid retail robot is ready to greet you" at the following URL address http://www.engadget.com/2015/04/20/toshiba-aiko-chihira-robot/]

Throughout this description the term "robot" is used to indicate a mechanical or virtual artificial agent, usually an electro-mechanical machine that is guided by a computer program or electronic circuitry. In the present invention we refer to multiple embodiments of robots from vending machine, information kiosks, virtual online assistants, to physical robots, with speech capabilities and optionally motion, gesture and expression capabilities.

It is clear that a uniform interaction is not as effective as a personalized interaction, where the needs of the human being served are identified and the message or the entire interaction is tailored to suite the human's personality.

It is both technically and socially preferred that such personalization is conducted without accessing the user's connected devices or identifying the user otherwise. In short, anonymous personalization by a robot is preferred.

Figure 17:
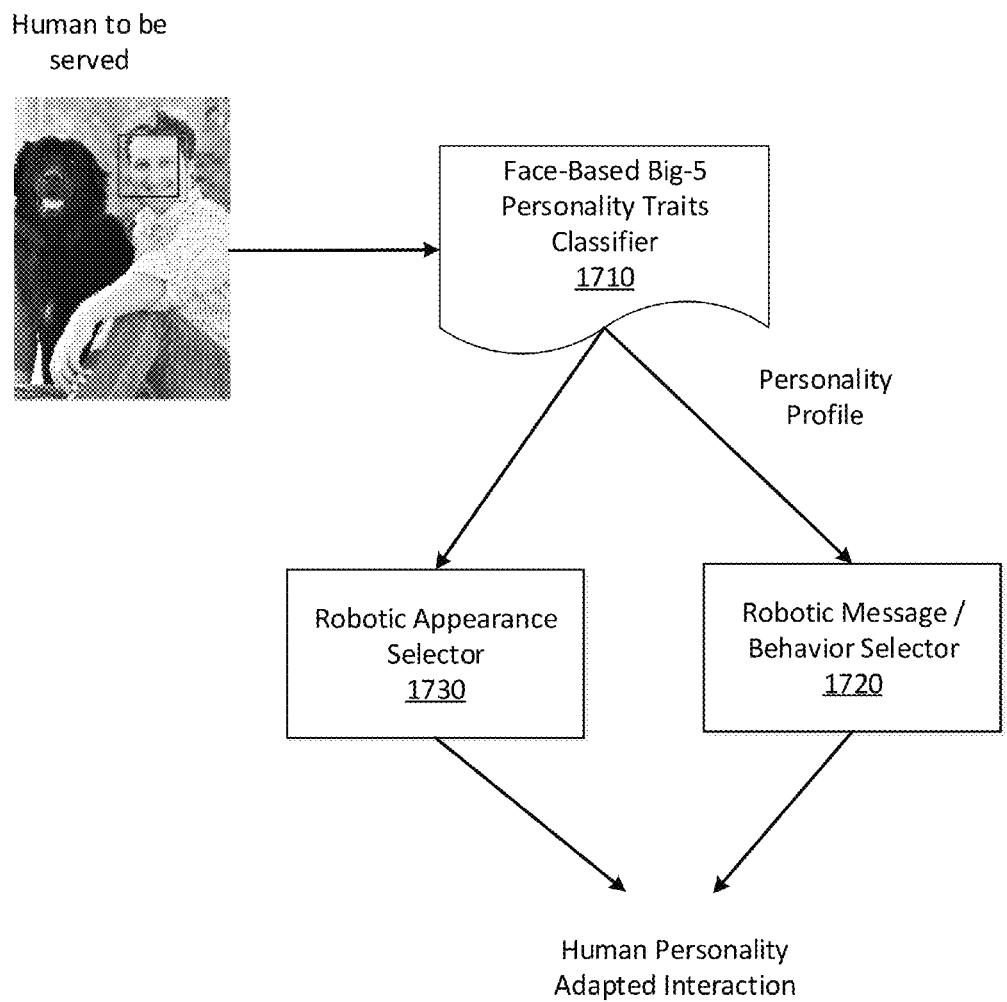
FIG. 17 schematically illustrates an implementation of a robotic service, according to an embodiment of the present invention.

According to one embodiment of the present invention, as shown in FIG. 17, a robot may capture images of the human through a connected camera or by other image capturing means, predicts personality traits (for example, Big-5 traits) of the human by using Face-Based Big-5 Personality Classifier 1710 and personalizes the interaction with the human to best communicate/serve/protect/sell to that human.

Said personalization of interaction layer to match the human personality traits may consist of: at least one of personalized message/answer/dialog and personalized behavior: e.g. quiet/dynamic/friendly, as selected by Robotic Message/Behavior Selector/Modifier 1720 personalized appearance: gender, age, face shape and facial feature, body size and shape.

In particular, a virtual (screen display/hologram) or physical avatar (robot), whose face/body will be modified/tailored/selected to the specific served human, by Robotic Appearance Selector 1730 to get better interactions, results, save time, in specific applications such as:

Vending machines/Automatic Teller Machines (ATM), which will sell or serve humans/people;
Caring machines/robots, which will advise, or serve in medical/pharmaceutical/sport training;
In education, machines/robots, which will teach/educate/train or advise students;
Financial/insurance advisors;
Robot drivers/sailors/pilots/tourist guides/guards shall increase human confidence and usage level by adapting their appearance and interaction to the human personality;
Personal aids, assistants, house-keepers, baby-sitters, adult helpers, virtual friends shall increase human confidence and value by adapting their appearance and interaction to the human personality.

In a specific embodiment, said virtual (screen display/hologram) or physical avatar (robot), will be modified/tailored/selected/shaped according to the specific purpose. For example, if the desired purpose is convincing the user to select a specific service, from say an insurance company, the robot's face will be selected/shaped to have a large width to height ratio, which has been shown in psychological studies to be associated with an authoritative personality.

According to another embodiment of the present invention, said personality-adapted appearance shall comprise screen color/background, font shape, size and color. In another embodiment of the present invention, robot/virtual aid voice will be selected/modified according to the human personality by modifying audio level, voice pitch (male/female) and speed.

Online vs. Offline Analysis

The present invention allows capturing personality traits from face images in real-time, using images captured by an integrated/attached camera. This has the benefit of immediate response and improved interaction without any identifying information regarding the user and also in situations where the user is "random"—such as out-of-home advertising/kiosks. Additionally, previously captured personality traits can be retrieved from a local/remote database and used during interactions with a known/identifiable user. This is the benefit of managing interactions when images are not currently available or not available at the required quality.

GUI/UX

According to a further embodiment of the present invention, user personality traits are used to facilitate man-machine interaction, by modifying the content and/or appearances of presented information, based on such traits. In a simple example, the graphical design of a web page will be altered based on user personality to facilitate navigation and decision making. As a more specific example, a commerce web-page will highlight the practical advantage of a product for one user, the cost-saving element for another and a design/appearance ("cool factor") element for yet another user.

As another example, the appearance of the displayed information will be modified, using flexible User Interface (UI) or User Experience (UX) elements—cold vs. warm colors, font style and size, general layout of the display, etc. Such personality-adaptive appearance may cause the user to spend more time in that screen/web-page and increase exposure to presented information.

Gaming Consoles

Current gaming consoles include a camera as a standard/optional device for gesture recognition and other natural user interface applications. Example: Microsoft Kinect. According to a further embodiment of the present invention, user face images are captured by the camera, and identified personality traits are used to enhance the gaming experience. Example: Enhancing first-person shooter games by controlling scene and enemies appearances to suit the player will result in better conversion rates, more playing time, better response to embedded commercial messages, etc.

Performance Based Advertising

According to another embodiment of the invention, the metadata contains one or more performance scores and such embodiment may be used to generate leads in the field of performance based advertising. ["Performance Based Pricing Models in Online Advertising: Cost-Per-Click vs. Cost-Per-Action"—http://faculty.som.yale.edu/JiwoongShin/Downloads/workingpapers/PerformanceBasedPricingModels.pdf]

In this field, the price per lead or other measure of value is related to a performance measure achievable from the lead. Such measure may include the lead's Lifetime Value (LTV), a desired behaviour (viral behaviour in online gaming), etc. Typically, the customer has an installed base of users that achieve or surpass the desired performance level. Also, the customer may have a control group comprising of users that fail to achieve the desired performance level, or another suitable control group.

Figure 16:
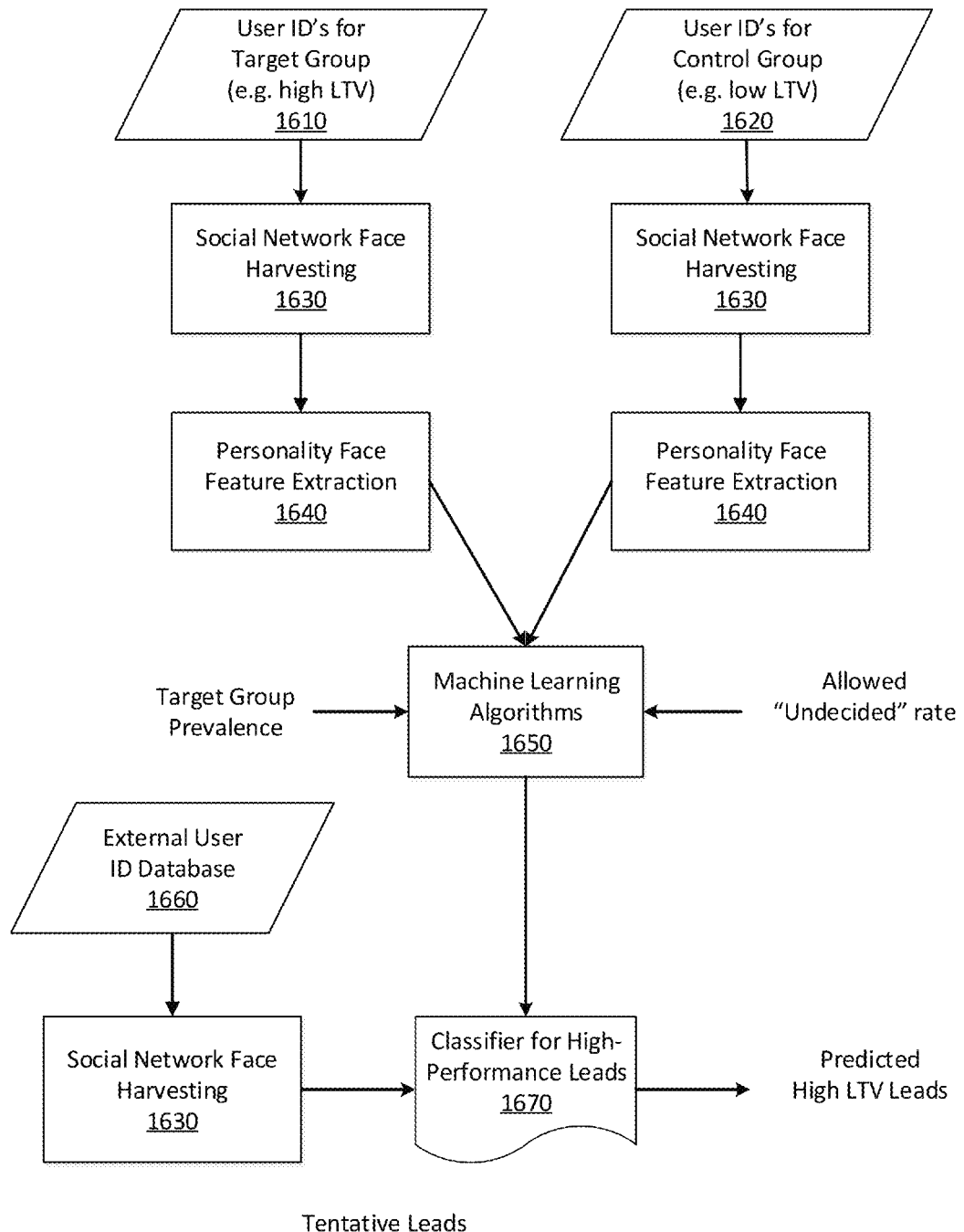
FIG. 16 depicts an embodiment for high-performance lead generation system, according to an embodiment of the present invention.

FIG. 16 depicts an embodiment for high-performance lead generation system, according to an embodiment of the present invention. The embodiment shall be described for a performance measure which is a customer Lifetime Value (LTV or CLTV), but is applicable to any performance measure or another figure of merit that is desired to be optimized with respect to a selected group of individuals. In this embodiment it is assumed that the current user base contains large enough (typically hundreds) groups with high LTV and low LTV, as depicted by data 1610 and 1620.

It is further assumed that all users in the specific embodiment are represented and are accessible via their UID (User ID).

Given groups 1610 and 1620, a social network face harvesting module 1630 (as described in FIG. 15) converts the harvested faces into a set of aligned and cropped face image which are in turn converted to Face Features/Descriptors by module 1640.

According to the present invention, the inputs of machine learning algorithms 1650 comprise not only of the respective descriptors but also: Target Group Prevalence compared with control group: for example it may be a high TLV user is 10 time less common that a low TLV user.

The allowed undecided/Don't Know rate. By allowing keeping a larger percentage of the scanned population undecided, one can increase the accuracy of the Predicted High TLV leads generated by classifier 1670. To produce the leads, an external user ID database 1660 is harvested and input to the Classifier 1670.

System Architecture

The present invention is usable in both consumer and corporate applications (B2B, B2C, C2C), for both in-home and out-of-home, both embedded in a device or distributed to a local server, a remote server or cloud processing resources. To support a wide variety of applications, possible implementations of the present invention may include one or more of the following modalities:

- PC-based: in form of software pre-installed or downloaded to one's computer.
- Remote-server: all analysis steps 110-180 in FIG. 1 are conducted on a remote server. Face images captured by the user are uploaded to the server which responds with personality traits and interactions guidelines.
- Cloud-based: an online file storage web service running on a cloud infrastructure such as Amazon S3.
- Distributed: face detection and pose, quality and expression filtering per step 120-150 in FIG. 1 is done on the client side. This is most useful for video-based applications on a smartphone or a tablet, where client-side processing reduces computation and communications overload on the server. An additional merit is that of privacy where the image descriptors generated by module 150 and sent over a communication networks cannot be reconstructed as an image or other personally identifiable data.
- Application Programming Interface (API) which allows embedding the personality trait identification into $3^{rd}$ party client products/applications, while relying on remote server processing as described above.
- Software Development Kit (SDK) which provides PC-based processing or remote server processing to be included in a $3^{rd}$ party application.
- Embedded as DSP/processor software, IP core provided as part of a chip or a chip design allows placing the entire knowledge on the device for independent operation and fast response.

Behavioral Training of Trait Classifiers

The present invention teaches how to compute trait values from face images, based on prior knowledge that relates face/face part appearance to such trait values. In a specific example, an early adopter buyer type may characterized by the traits as shown in the tables 1210 and 1220 in FIG. 12.

According to an additional embodiment of the present invention it is possible to train classifiers based on behaviorally tagged face images. In the example above, we can tag certain people as early adopters based on their online behavior, questionnaires, membership in a certain group, etc. In this specific example, suppose that we have a second group of users that can be tagged as economical buyer type, again based online behavior, purchase history, questionnaires, and membership in a certain group.

Without breaking either behavior into specific traits, one may train a classifier to distinguish between these two groups. This has the following advantage: Faster, More Accurate, May be used to define new behavioral groups without the need to break them into based traits.

According to the present invention, it is possible to predict the membership of a person to a certain group of people (e.g., researchers).

Collecting images of faces of people who known to be researchers (from universities' websites) and images of people who known to be non-researchers—such as models, basketball players and actors. Then we normalize and calculate an appearance descriptor (SIFT) as described above and look for the best SVM classifier (kernel, parameters and threshold) to separate between those two groups.

Alternatively, perform multi-trait analysis for each face image, resulting in a vector of magnitudes, which serves as the descriptor. That way, we can separate between the wanted group and the other population and we could find a representative of the group—thus know which traits and magnitude are typical and describe this group—that can also be expand to classification of several groups.

Note: If this group is infrequent in the normal population other learning methods should be used such as boosting or nu-svc.

Training with Performance Monitoring Tools

According to a specific embodiment of the present invention it is required to group users into specific categories based on their online behavior and then train specific classifiers to predict online behavior based on that person's face images only. Specific examples of current tools include: Google Analytics, user experience management tools from Compuware, etc.

According to the present invention, performance monitoring tools are used to collect user behavior data for users and identify behavioral patterns of the users. In parallel, face images of these users are collected via mechanisms such as Facebook connect.

Given enough (say 300) distinct face images for each behavioral pattern instance, an image-based classifier is trained to predict which pattern a certain person belongs to, based on its face image alone. Then, whenever certain online strategies are developed per each behavioral pattern of a group of patterns, and one or more face images of a person are available, that person can be associated with the correct behavioral pattern, based on its face image alone.

Specific Facial Structure Classifier

In a specific embodiment of the present invention, a classifier for a single facial structure is trained from examples. One such structure can be the eyebrows distance from the eyes. In a similar manner, classifiers can be trained for multiple structures:

Face width: wide/balanced/narrow
Lower lip: full/medium/thin
Sharp/bulbous noise
Nose to upper lip distance
Eye orientation (as shown in FIG. 8).

This is done by collecting examples for the different variations of each such face structure and applying the descriptor extraction and machine learning/classifier training process according to the present invention. One may choose to train the classifier on the entire face, or to crop only the specific part of the face train the classifier on that part only.

Single-Trait Classifiers

According to a specific embodiment of the present invention, a single trait classifier is constructed from examples. This may be done in one or more of the following schemes:

Use meta data to group people that share a clear trait, and then train a classifier to predict that group membership and finally label the classifier by that clear trait. For example one may assume that a certain group (say Poker players) comprises risk takers, another group (say nurses) comprises care-givers and another group (say MMA fighters) comprises aggressive persons. Thus one may obtain specific trait classifiers from group metadata (profession, hobby, etc.)

Use crowd source in social networks or services such as Amazon Mechanical Turk to label faces with certain traits (for example reliability) based on the assumption that if a certain personality trait or capability can be related to face appearance, that a classifier trained based on such crowd source will be able to predict such trait or capability.

Run multiple face structure classifiers, trained as described above on certain groups of people, tagged by profession/hobby/online behavioral metadata and rank said classifiers with their relative ability to predict such metadata correctly from face images only. For example, if near eyebrows are frequent in successful sales persons and MMA fighters, than one may deduce that near eyebrows indicate tendency to close-range emotional or physical contact.

Multi-Trait Personal Characterization

According to one embodiment, a user profile of interest comprises multiple traits. These traits may be non-weighted (or equally weighted). In a different embodiment the user profile comprises weighted traits where the weight signifies the absolute/relative significance of the trait in the context of a specific profile. In some embodiments, certain trait weights may be negative.

As a specific example, consider a user profile which is a buyer profile. Characterizing buyers is of great importance, in marketing and in particular in online marketing and sales applications. Let the buyer profile may be one of the following: Early Adopter, Economical, Me Too or Sensitive.

In a certain embodiment it is desired to select one primary profile for each online buyer. In another embodiment better conversion may be obtained from assigning a secondary profile to a user, and so on. For example, a buyer may be assigned an "Economical" primary type and a "Me Too" secondary type.

Figure 12:
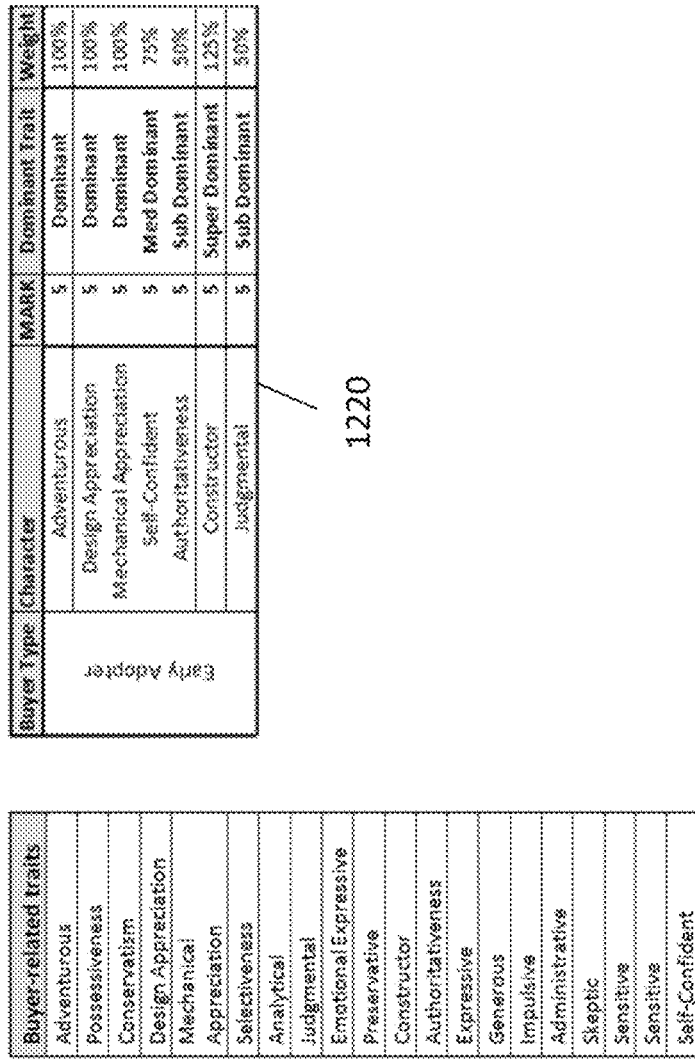
FIG. 12 shows a specific example of an early adopter buyer type characterized by traits.

Social science as well as behavioral and marketing research may be useful in identifying a set of personal traits associated with buyer types. Refer to FIG. 12 for a set of buyer-related traits 1210.

Based on such sources of information, as well as certain heuristic/common sense, one may specify certain buyer types by a selection of traits, target or ideal values for these traits, designating the trait as Dominant, etc. and assigning a certain weight to each trait. The result of weighting is a total score value representative of the probability that the buyer is indeed of that specific type.

Figure 13:
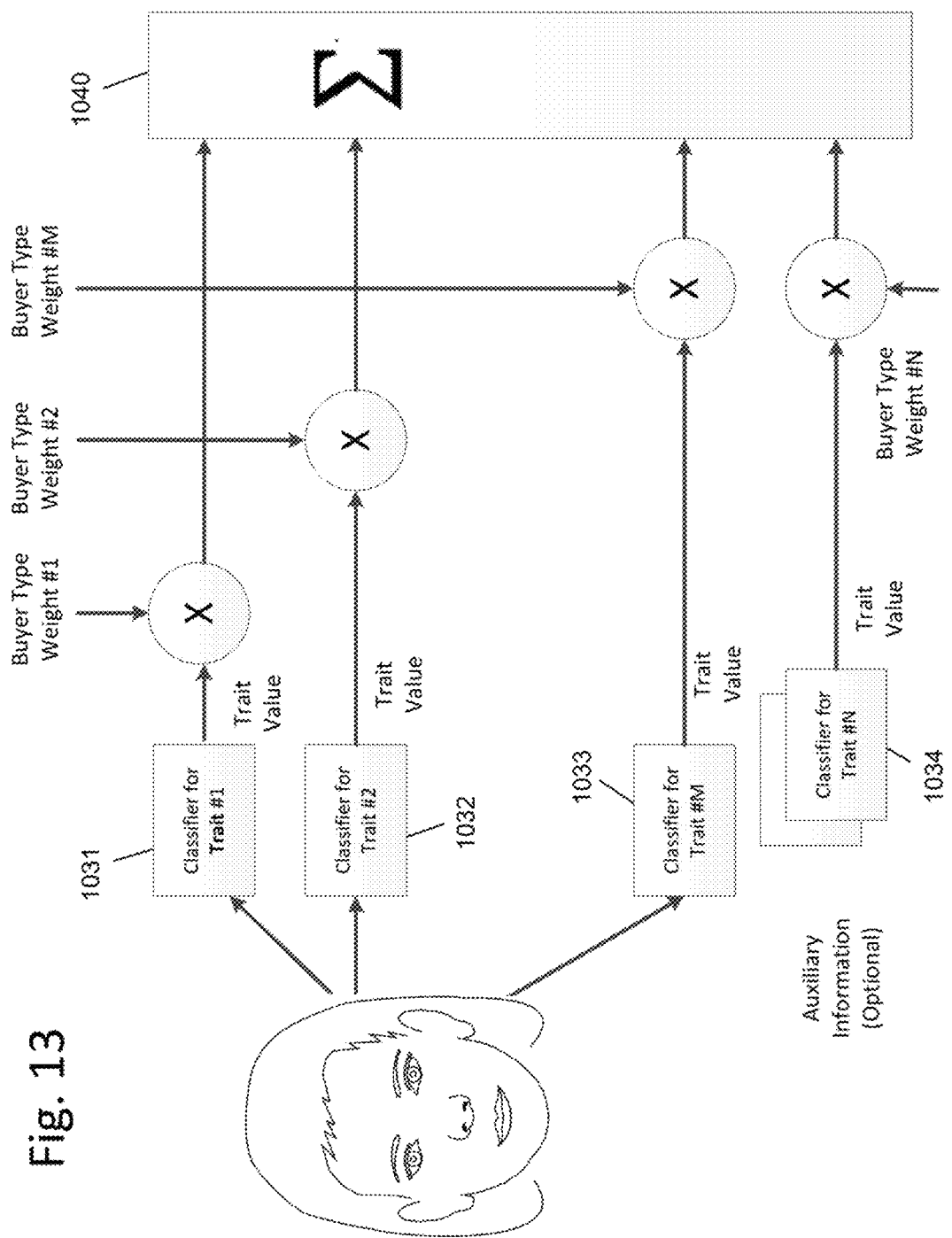
FIGS. 13 and 14 depict a score computation methods from biometric information such as face images, according to an embodiment of the present invention.

FIG. 13 depicts how such a score can be computed from biometric information such as face images, according to an embodiment of the present invention. According to the present invention a classifier is constructed or trained per each trait of relevance and then during runtime, used to produce a trait value—for example an integer in the range [1,5] (as indicated by numerals 1031-1034).

The individual trait values (1031-1034) are then combined to generate a composite score for the specific buyer type as indicated by numeral 1040. A common form for weighting and combining is a linear, weighted sum as depicted in FIG. 13. Alternatively one can use decision trees.

The framework depicted in FIG. 13 may be extended to include auxiliary information from other source of data. According to the present invention Auxiliary information is passed to trait classified #M+1 to #N, weighted by the respective weight and then added to the summation.

Figure 14:
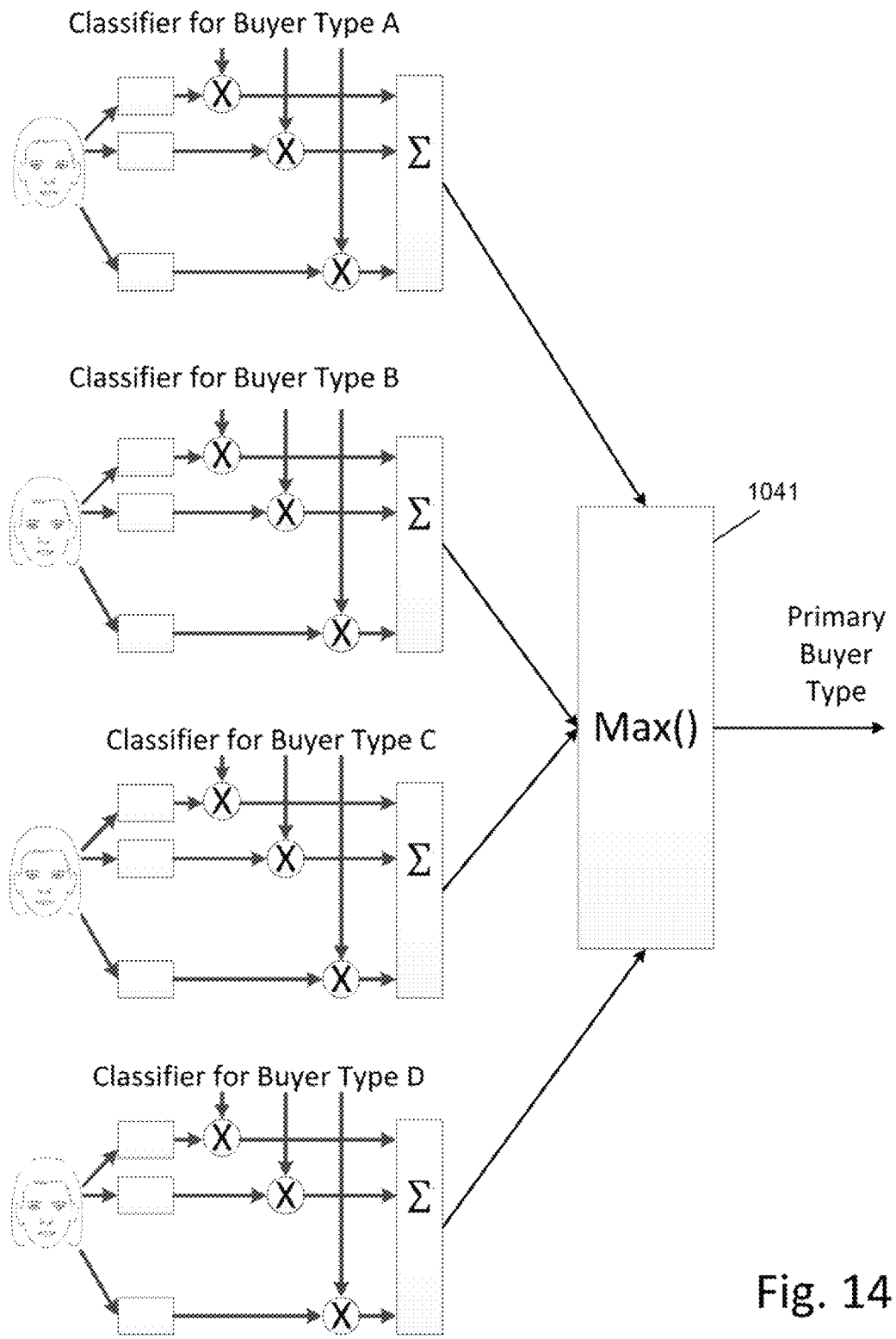

Now that we have generated buyer-type scores for each buyer type, we may select the appropriate buyer type by running a series of buyer-type classifier (as indicated by Buyer Type A, Buyer Type B, Buyer Type C and Buyer Type D in FIG. 14)—one for each buyer type and then selecting the buyer type yielding the largest score, as indicated by numeral 1041 in FIG. 14.

Going back to FIG. 13, assigning weights heuristically as originally suggested by the present invention has the advantage of building user profiles from general social science knowledge, without any ground truth that can be used for training. This may be useful in the field of Human Resources (HR) where we may want to seek for best candidates for a new position, and often we do not have enough positive and negative examples of people who have assumed that role in the past.

In other application, we may have access to tagged user data and we may use it to assign weights to the different traits, thus improving our classification accuracy based on past performance.

Considering the buyer type, one may have access to images of users that may be considered early adopters, based on their past online behavior—such as searching for/purchasing gadgets and new products online.

As another example, one may have access to images of users that may be considered "Me Too", based on their past online behavior—such as extensively browsing user reviews, searching for/purchasing products that scored high in points and number of reviews, etc.

Given the output of the trait classifiers for these user groups, the weights may be adjusted automatically, using known methods of supervised training.

Given a set of training examples, each marked as belonging to one of two categories, an SVM (Support Vector Machine) training algorithm builds a model that assigns new examples into one category or the other. An SVM model is a representation of the examples as points in space, mapped so that the examples of the separate categories are divided by a clear gap that is as wide as possible. New examples are then mapped into that same space and predicted to belong to a category based on which side of the classifier gap they fall on.

For the case of buyer types, as for many embodiments according to the present invention, there are multiple types and Multiclass SVM is required. A common solution to the multiclass problem is to reduce it to multiple binary classification problems by building binary classifiers which distinguish between (i) one of the labels and the rest (one-versus-all) or (ii) between every pair of classes (one-versus-one).

Classification of new instances for the one-versus-all case is done by a winner-takes-all strategy, in which the classifier with the highest output function assigns the class (it is important that the output functions be calibrated to produce comparable scores).

For the one-versus-one approach, classification is done by a max-wins voting strategy, in which every classifier assigns the instance to one of the two classes, then the vote for the assigned class is increased by one vote, and finally the class with the most votes determines the instance classification.

In the case that we have a large collection of untagged user images which we believe represent diverse types (for example buyer types), one may apply unsupervised learning schemes such as k-means in a space of trait values.

HR Application

The present invention teaches how to match a candidate to a job/function based on the candidate's face images. According to the present invention, the candidate's personality characteristics can be derived from the candidate's face image in a fully automated manner.

Social sciences and HR practices are used to list/name the personality traits of relevance, and also assign weights to the trait in order to derive at least one multi-trait score which will be used to rank candidates.

The weights are assigned per specific job based on social science and HR agency expertise. For example if the job is R&D team leader, then interpersonal & management capabilities as well as responsibility will be weighed more than creativity and verbal communications. Such an approach is suitable to the structure depicted in FIG. 13 with the weight values derived manually.

Alternatively, one may collect numerous face images of successful R&D team leaders for example based on their position in leading companies, number of patents granted, and LinkedIn endorsements and so on. Then using the traits as descriptors, a learning algorithm such as SVM may adjust the weights optimally.

3D Face Analysis

Deriving personality traits from 2D images has the advantage of availability. Practically all face images available online in social networks such as Facebook and LinkedIn, in picture sharing application, etc. are 2D.

Furthermore, almost all face capturing devices such as webcams, laptop/tablet camera, wearable devices such as Google Glass, etc. are 2D as well.

Recent advances in sensor technologies make the acquisition of depth maps applicable to face images as well. Depth sensing techniques include stereoscopic 3D (S3D), structured light sensing such as original Kinect sensor by PrimeSense and Time-Of-Flight techniques as employed New Kinect camera of Xbox One gaming console.

Having a depth map, in addition to the RGB image, facilitates face detection, pose detection, face alignment and face recognition step as described in the present invention. Furthermore, a single/few RGBZ images may be used to detect personality traits which usually require a profile image such as nose and chin-related traits.

Therefore, the specific embodiments of the present invention cover not only 2D images (color images, luminance images, etc.) but also depth images and combined RGBZ images.

In a specific embodiment, the information captured from the depth sensor is represented in the form of a depth map and in the form of a luminance map. Face pose is derived from the depth map and used to align both the depth and luminance representation of the face.

Trait classification is performed independently on each representation (following a process of learning on a large set of such aligned maps). The results are then combined to a single value of the personality trait, as a weighted average with either preset weights or dynamically adjusted weights based on the estimated precision of each value.

According to another embodiment, a classifier such as SVM is trained on a combined set of features extracted from both the depth and the intensity image.

In another embodiment, the training process which has to rely on a large number of images is still performed in 2D, which the prediction process uses RGBZ images for better normalization and alignment, and also exploit "profile" image features from frontal faces.

When collections of face depth images become available, the training process according to the present invention can be extended to such images as well.

Search Engine Applications

The ability to tag human faces with metadata which is directly ("adventurous") or indirectly ("researcher") to personality traits and capabilities, can be integrated with any search engine technology to further narrow search results/ improve the accuracy of search. Such tags may be computed offline and indexed to facilitate search using prior art techniques of textual search.

Alternatively, personality traits may be computed online as the final step in the query execution. The faster textual elements of the query are executed first, resulting in a short list of search results. Then, face images are retrieved for each of the top textual search results/matches and undergo the processes depicted in FIGS. 1, 2 and 3.

Finally, the trait-based search filters/criteria are applied to the personality/capability/behavior descriptors derived from said face image.

The terms, "for example", "e.g.", "optionally", as used hereinabove, are intended to be used to introduce non-limiting examples. While certain references are made to certain example system components or services, other components and services can be used as well and/or the example components can be combined into fewer components and/or divided into further components.

The aforementioned program modules include routines, programs, components, data structures, and other types of structures that perform particular tasks or implement particular abstract data types for predicting personality traits, capabilities and suggested interactions from face images. moreover, those skilled in the art will appreciate that the invention may be practiced with plurality of computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The aforementioned embodiments of the invention may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

The functions described hereinabove may be performed by executable code and instructions stored in computer readable medium and running on one or more processor-based systems. However, state machines, and/or hardwired electronic circuits can also be utilized. Further, with respect to the example processes described herein, not all the process states need to be reached, nor do the states have to be performed in the illustrated order. Further, certain process states that are illustrated as being serially performed can be performed in parallel.

All the above description and examples have been given for the purpose of illustration and are not intended to limit the invention in any way. Many different mechanisms, methods of analysis, electronic and logical elements can be employed, all without exceeding the scope of the invention.

The invention claimed is:

1. A method of identifying and/or predicting personality traits and ranking and/or searching individuals from at least one image of each of said individuals' faces, comprising:
   a) collecting training images of multiple persons for machine learning training purpose in order to identify personality traits from said images, wherein each of said training images is associated with metadata characteristics of human personality traits;
   b) grouping said collected training images into training groups according to said associated metadata;
   c) applying machine learning algorithm(s) on images in at least one of said training groups for training at least one image-based classifier to identify at least one characteristic of human personality trait from at least one image of a specific subject person;
   d) providing at least one face image for each of said individuals;
   e) applying said at least one image-based classifier to at least one face image for each of said individuals for identifying at least one characteristic of at least one human personality trait of said individuals;
   f) combining said at least one characteristic of at least one human personality trait with at least one other characteristic or at least one additional metadata relating to each of said individuals into a composite score; and
   g) ordering the individuals based on the composite score and selecting at least one individual based on said ordering.

2. The method according to claim 1, wherein the personality traits and the associated metadata characteristics are selected from a group consisting of: at least one personality trait from a set of human traits, or at least one personal capability from a set of capabilities, or at least one behavioral trait from a set of human behaviors.

3. The method according to claim 1, wherein the associated metadata is at least one of the following: profession, online behavior, endorsements from social network, crowd source, real-world behavior, psychological profile, health profile, or performance score.

4. The method according to claim 1, further comprising converting a subset comprising at least one of the at least one image of at least one of the individuals' faces into a standard, normalized representation by performing geometric rectification and/or frontalization on said face images.

5. The method according to claim 1, further comprising providing an image descriptors computation module for generating multiple image descriptors from whole face images or from specific face parts, during classifier development process, to facilitate a specific trait or capability, wherein using said multiple image descriptors, an array of classifier modules is able to predict one or more personality traits or one or more personality capability, either with or without an associated magnitude.

6. The method according to claim 5, further comprising integrating the one or more personality traits or one or more personality capability with associated magnitude into a coherent set of personality descriptors, such that whenever a descriptor is manifested in more than one result, a weighting process produces a weighted combination of the individual results.

7. The method according to claim 1, wherein the composite score is obtained from at least one face-derived personality trait or at least one face-derived personality capability or at least one face-derived personality behavior with optional metadata, by method of weighing.

8. The method according to claim 1, further comprising generating description of one or more personality characteristics by applying a plurality of image-based classifiers to one or more images of one or more of the individuals, wherein said description is obtained by a face-based personality analysis module.

9. The method according to claim 8, further comprising implementing the face-based personality analysis module in multimedia systems or applications adapted to interact with one or more persons in real-time, such that face images of person(s) can be captured from an imaging module associated with said multimedia system or application, in order to be analyzed by said module, either in real-time or off-line, wherein the multimedia systems or applications are selected from the group consisting of: video chat, conferences call, wearable computers, portable computer based devices, desktop computer based systems, customer relationships management, set-top boxes, smartphones, stand-alone/integrated camera, wearable camera with optional display such as Google Glass, a connected camera, an integrated/attached camera, and gaming consoles.

10. The method according to claim 1, further comprising searching for additional images of one or more of the individuals by using a name search engine that can be augmented by face recognition and analyzing said additional images to enhance the accuracy of predicted personality traits or capabilities.

11. The method according to claim 9, further comprising analyzing information during the interaction from plurality of content sources, including content of textual or audible data and integrating such information with one or more predicted/identified personality traits, wherein the audible data includes audio signals analysis of verbal communication by voice-based analyzer for obtaining personality cues, situation cues, emotion cues or audio signals of verbal communication into text form during the interaction.

12. The method according to claim 9, further comprising generating interaction recommendations, the recommendations being generic and content-based, according to the description of one or more personality characteristics, such that interaction analysis and the generated recommendations are integrated within the applications.

13. The method according to claim 8, further comprising classifying the type of the one or more individuals according to one or more predicted personality characteristics, thereby allowing facilitating personal advertising by providing adaptive message to said one or more individuals according to said classifications.

14. The method according to claim 1, further comprising:
  a) capturing one or more images of one or more individuals by a mechanical or virtual artificial agent;
  b) predicting personality traits of said one or more individuals by using at least one image-based classifier, thereby enabling to personalize an interaction of said artificial agent with said one or more individuals.

15. The method according to claim 1, wherein the metadata contains one or more performance scores, thereby enabling to generate leads in the field of performance based advertising, such that the price per lead or other measure of value is related to a performance measure achievable from at least one of said leads.

16. A non-transitory computer-readable medium that stores instructions executable by one or more processing devices to perform a method for identifying and/or predicting personality traits and ranking and/or searching individuals from at least one image of each of said individuals' faces, comprising:

a) instructions for collecting training images of multiple persons, wherein each of said training images is associated with metadata characteristic of human personality traits;
b) instructions for grouping said collected training images into training groups according to said associated metadata;
c) one or more machine learning algorithms for training at least one image-based classifier to identify at least one characteristic of human personality trait from said at least one image of said individuals' faces;
d) instructions for applying said machine learning algorithms on images in at least one of said training groups;
e) instructions for receiving at least one face image for each of said individuals;
f) instructions for applying said at least one image-based classifier to at least one image of each of said individuals for identifying at least one characteristic of at least one human personality trait of said individuals;
g) instructions for combining said at least one characteristic of at least one human personality trait with at least one other characteristic or at least one additional metadata relating to each of said individuals into a composite score; and
h) instructions for ordering said individuals based on said composite score and selecting at least one individual based on said ordering.

\* \* \* \* \*